United States Patent
Willey et al.

(10) Patent No.: US 9,903,946 B2
(45) Date of Patent: Feb. 27, 2018

(54) LOW COST APPARATUS AND METHOD FOR MULTI-MODAL SENSOR FUSION WITH SINGLE LOOK GHOST-FREE 3D TARGET ASSOCIATION FROM GEOGRAPHICALLY DIVERSE SENSORS

(71) Applicant: RFNAV, Inc, Glenelg, MD (US)

(72) Inventors: Jefferson M. Willey, Glenelg, MD (US); Richard E. Pavek, Marble Falls, TX (US)

(73) Assignee: RFNAV, INC., Glenelg, MD (US)

( * ) Notice: Subject to any disclaimer, the term of this patent is extended or adjusted under 35 U.S.C. 154(b) by 0 days.

(21) Appl. No.: 15/606,848

(22) Filed: May 26, 2017

(65) Prior Publication Data
US 2017/0343665 A1    Nov. 30, 2017

Related U.S. Application Data

(60) Provisional application No. 62/341,939, filed on May 26, 2016.

(51) Int. Cl.
  *G01S 13/93*   (2006.01)
  *G01S 13/86*   (2006.01)
  (Continued)

(52) U.S. Cl.
  CPC ............ *G01S 13/86* (2013.01); *G01S 13/003* (2013.01); *G01S 13/89* (2013.01); *G01S 13/931* (2013.01); *G05D 1/0257* (2013.01)

(58) Field of Classification Search
  CPC ................................ G01S 13/003; G01S 13/86
  (Continued)

(56) References Cited

U.S. PATENT DOCUMENTS 5,341,141 A     8/1994   Frazier et al.
6,492,935 B1 *  12/2002  Higuchi ............... G01S 13/931
                                                          342/54
(Continued)

OTHER PUBLICATIONS

Fortmann et al., "Multi-Target Tracking using Joint Probabilistic Data Association," Proceedings of the 19th IEEE Conference on Decision and Control including the Symposium on Adaptive Processes, Albuquerque, NM, pp. 807-812, Dec. 10-12, 1980.

(Continued)

*Primary Examiner* — Marcus E Windrich
(74) *Attorney, Agent, or Firm* — Edell, Shaprio & Finnan, LLC

(57) ABSTRACT

A system performs operations including receiving pairs of sensor signals indicative of imaging of an environment, each pair of sensor signals including (i) a first sensor signal received from a first sensor and including first spatial coordinates and a first signal characteristic and (ii) a second sensor signal including second spatial coordinates and a second signal characteristic. The operations include identifying valid pairs of sensor signals, including determining that an address including the first coordinates of the first sensor signal of a given pair and the second coordinates of the second sensor signal of the given pair corresponds to an admissible address in a set of admissible addresses stored in a data storage. The operations include identifying, from among the valid pairs of sensor signals, pairs of sensor signals that satisfy a threshold, including determining that a value based on a combination of the first signal characteristic of a given pair and the second signal characteristic of the given pair satisfies a threshold value. The operations include generating a representation of a target in the environment based on the identified pairs of sensor signals that satisfy the threshold.

30 Claims, 17 Drawing Sheets

(51) Int. Cl.
*G01S 13/89* (2006.01)
*G01S 13/00* (2006.01)
*G05D 1/02* (2006.01)

(58) Field of Classification Search
USPC .................................................. 342/70–72
See application file for complete search history.

(56) References Cited

U.S. PATENT DOCUMENTS

| | | | | |
|---|---|---|---|---|
| 7,889,116 | B2* | 2/2011 | Harada | G01S 13/87 342/59 |
| 8,471,759 | B2* | 6/2013 | Sun | G01S 13/36 342/175 |
| 2007/0080850 | A1* | 4/2007 | Abe | G01S 13/931 342/52 |
| 2009/0251355 | A1* | 10/2009 | Nanami | G01S 13/931 342/27 |
| 2014/0297171 | A1* | 10/2014 | Minemura | G08G 1/166 701/301 |
| 2015/0260498 | A1 | 9/2015 | Soohoo | |

OTHER PUBLICATIONS

Richards, M., "Fundamentals of Radar Signal Processing," 2nd Edition, ISBN: 0071798323, McGraw-Hill Education, New York, pp. 413-425, 2014.
Austin, C., "Sparse Methods for Model Estimation with Applications to Radar Imaging," PhD Dissertation, Ohio State University,163 pages, 2012.
Kazimir et al., "Localisation of Motionless Persons in 3D Space by UWB Radar," Progress in Electromagnetics Research Symposium Proceedings, Guangzhou, China, pp. 525-529, Aug. 25-28, 2014.
International Search Report and Written Opinion for App. Ser. No. PCT/US17/34783, dated Aug. 24, 2017, 11 pages.

* cited by examiner

LOW COST APPARATUS AND METHOD FOR MULTI-MODAL SENSOR FUSION WITH SINGLE LOOK GHOST-FREE 3D TARGET ASSOCIATION FROM GEOGRAPHICALLY DIVERSE SENSORS

CLAIM OF PRIORITY

This application claims priority U.S. patent application Ser. No. 62/341,939, filed on May 26, 2016, the contents of which are incorporated here by reference in their entirety.

BACKGROUND

This description relates to techniques for 3-D multi-modal sensor fusion and target association from incomplete and complete geographically diverse sensors. Fundamental operations of object location, tracking, identification, and multi-dimensional imaging are all supported by properly fused multi-sensor measurements.

With the increased interest in autonomous vehicles, accurate and precise 3-D target location is desired for improved performance. Bistatic and multi-static sensor systems have the potential for fine resolution discrimination amongst targets in Cartesian coordinates. However, this multiple sensor resolution performance in a multiple-target setting only comes when high performance sensor-to-sensor association is achieved.

SUMMARY

The multiple-sensor systems and techniques described here relate to achieving sensor fusion and target association to enable accurate and precise target location, tracking, identification, and multi-dimensional imaging. One application of these systems and techniques can enable the use of low-cost Boolean radar systems for low-ghost or ghost-free imaging, e.g., of dense scenes such as those found in autonomous vehicle applications.

In an aspect, a system includes a computing device including a memory configured to store instructions and a processor to execute the instructions to perform operations. The operations include receiving multiple pairs of sensor signals indicative of imaging of an environment by a sensor system, each pair of sensor signals including (i) a first sensor signal received from a first sensor of the sensor system and including first spatial coordinates and a first signal characteristic and (ii) a second sensor signal received from a second sensor of the sensor system and including second spatial coordinates and a second signal characteristic. The operations include identifying valid pairs of sensor signals from among the multiple pairs of sensor signals, in which identifying a given pair of sensor signals as a valid pair includes determining that an address including the first coordinates of the first sensor signal of the given pair and the second coordinates of the second sensor signal of the given pair corresponds to an admissible address in a set of admissible addresses stored in a data storage. The operations include identifying, from among the valid pairs of sensor signals, one or more pairs of sensor signals that satisfy a threshold, in which identifying that a given pair of sensor signals satisfies a threshold includes determining that a value based on a combination of the first signal characteristic of the given pair and the second signal characteristic of the given pair satisfies a threshold value. The operations include generating a representation of a target in the environment based on the identified one or more pairs of sensor signals that satisfy the threshold.

Embodiments can include one or more of the following features.

Receiving multiple pairs of sensor signals includes receiving multiple pairs of radar signals from a single-look radar system.

The operations include identifying non-admissible pairs of sensor signals from among the multiple pairs of sensor signals, and in which the representation is generated without using the non-admissible pairs of sensor signals. Identifying a given pair of sensor signals as a non-admissible includes determining that an address including the first coordinates of the first sensor signal of the given pair and the second coordinates of the second sensor signal of the given pair does not correspond to an admissible address in the set of admissible addresses.

The operations include identifying pairs of sensor signals that correspond to points outside a field of view of the first sensor and the second sensor, and in which the representation is generated without using the pairs of sensor signals that correspond to points outside the field of view.

Identifying that a given pair of sensor signals satisfies a threshold includes determining that a product of the first signal characteristic of the given pair and the second signal characteristic of the given pair exceeds a minimum threshold value.

Identifying that a given pair of sensor signals satisfies a threshold includes determining that a difference between the first signal characteristic of the given pair and the second signal characteristic of the given pair is less than a maximum threshold value.

The operations include generating a vector corresponding to each of the identified pairs of sensor signals that satisfy the threshold, the vector for a given identified pair of sensor signals including (i) the address including the first coordinates of the first sensor signal of the given pair and the second coordinates of the second sensor signal of the given pair, (ii) the first signal characteristic of the given pair and the second signal characteristic of the given pair, and (iii) coordinates of a voxel center corresponding to the address. The coordinates of the voxel center corresponding to the address are stored in the data storage in conjunction with the admissible address corresponding to the address. Generating the representation of the target in the environment includes generating the representation based on the vectors corresponding to the identified pairs of sensor signals that satisfy the threshold.

The multiple pairs of sensor signals are indicative of imaging of an environment in the vicinity of a vehicle, and including controlling navigation of the vehicle based on the generated representation of the target in the environment.

The first sensor and the second sensor are located at different positions.

The first sensor and the second sensor include 2-D incomplete radars.

The first sensor and the second sensor include 3-D complete radars.

The first sensor is a different type of sensor from the second sensor.

The first sensor and the second sensor are selected from the group consisting of 2-D radar, 3-D radar, 3-D Lidar, 3-D stereoscopic camera, 3-D IR, and 3-D Sonar.

The first sensor and the second sensor are separated by a distance that exceeds a maximum spatial resolution of each of the first sensor and the second sensor.

The set of admissible addresses stored in the data storage includes a mapping between each admissible address and a set of 3-D coordinates. The operations include determining multiple sets of admissible addresses and mappings between each admissible address and the corresponding set of 3-D coordinates.

At least one of the first sensor and the second sensor forms part of a mobile device.

The operations include training the set of admissible addresses based on quantized voxels defined by boundaries obtained by combining smoothed covariance estimates and multiple coincidence detection methods.

Each sensor operates in a multi-dimensional space.

In an aspect, a system includes a computing device including a memory configured to store instructions and a processor to execute the instructions to perform operations. The operations include receiving multiple pairs of radar signals indicative of imaging of an environment by a radar system, each pair of radar signals including (i) a first radar signal received from a first radar sensor of the radar system and including first spatial coordinates and a first voltage and (ii) a second radar signal received from a second radar sensor of the radar system and including second spatial coordinates and a second voltage. The operations include identifying valid pairs of radar signals from among the multiple pairs of radar signals, in which identifying a given pair of radar signals as a valid pair includes determining that an address including the first coordinates of the first radar signal of the given pair and the second coordinates of the second radar signal of the given pair corresponds to an admissible address in a set of admissible addresses stored in a data storage. The operations include identifying, from among the valid pairs of radar signals, one or more pairs of radar signals that satisfy a threshold, in which identifying that a given pair of radar signals satisfies a threshold includes determining that a value based on a combination of the first voltage of the given pair and the second voltage of the given pair satisfies a threshold value. The operations include generating a representation of a target in the environment based on the identified one or more pairs of radar signals that satisfy the threshold.

Embodiments can include one or more of the following features.

The first radar sensor and the second radar sensor are located at different positions.

The first radar sensor and the second radar sensor include at least one of 2-D incomplete radars and 3-D complete radars.

The operations include identifying non-admissible pairs of radar signals from among the multiple pairs of radar signals, and in which the representation is generated without using the non-admissible pairs of radar signals.

The operations include identifying pairs of radar signals that correspond to points outside a field of view of the first radar sensor and the second radar sensor, and in which the representation is generated without using the pairs of radar signals that correspond to points outside the field of view.

The operations include generating a vector corresponding to each of the identified pairs of radar signals that satisfy the threshold, the vector for a given identified pair of radar signals including (i) the address including the first coordinates of the first radar signal of the given pair and the second coordinates of the second radar signal of the given pair, (ii) the first voltage of the given pair and the second voltage of the given pair, and (iii) coordinates of a voxel center corresponding to the address.

In an aspect, a computer-implemented method includes receiving multiple pairs of imaging signals indicative of imaging of an environment by an imaging system, each pair of imaging signals including (i) a first imaging signal received from a first imaging sensor of the imaging system and including first spatial coordinates and a first voltage and (ii) a second imaging signal received from a second imaging sensor of the imaging system and including second spatial coordinates and a second voltage. The method includes identifying valid pairs of imaging signals from among the multiple pairs of imaging signals, in which identifying a given pair of imaging signals as a valid pair includes determining that an address including the first coordinates of the first imaging signal of the given pair and the second coordinates of the second imaging signal of the given pair corresponds to an admissible address in a set of admissible addresses stored in a data storage. The method includes identifying, from among the valid pairs of imaging signals, one or more pairs of imaging signals that satisfy a threshold, in which identifying that a given pair of imaging signals satisfies a threshold includes determining that a value based on a combination of the first voltage of the given pair and the second voltage of the given pair satisfies a threshold value. The method includes generating a representation of a target in the environment based on the identified one or more pairs of imaging signals that satisfy the threshold.

In an aspect, one or more computer readable media storing instructions that are executable by a processing device, and upon such execution cause the processing device to perform operations. The operations include receiving multiple pairs of imaging signals indicative of imaging of an environment by an imaging system, each pair of imaging signals including (i) a first imaging signal received from a first imaging sensor of the imaging system and including first spatial coordinates and a first voltage and (ii) a second imaging signal received from a second imaging sensor of the imaging system and including second spatial coordinates and a second voltage. The operations include identifying valid pairs of imaging signals from among the multiple pairs of imaging signals, in which identifying a given pair of imaging signals as a valid pair includes determining that an address including the first coordinates of the first imaging signal of the given pair and the second coordinates of the second imaging signal of the given pair corresponds to an admissible address in a set of admissible addresses stored in a data storage. The operations include identifying, from among the valid pairs of imaging signals, one or more pairs of imaging signals that satisfy a threshold, in which identifying that a given pair of imaging signals satisfies a threshold includes determining that a value based on a combination of the first voltage of the given pair and the second voltage of the given pair satisfies a threshold value. The operations include generating a representation of a target in the environment based on the identified one or more pairs of imaging signals that satisfy the threshold.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
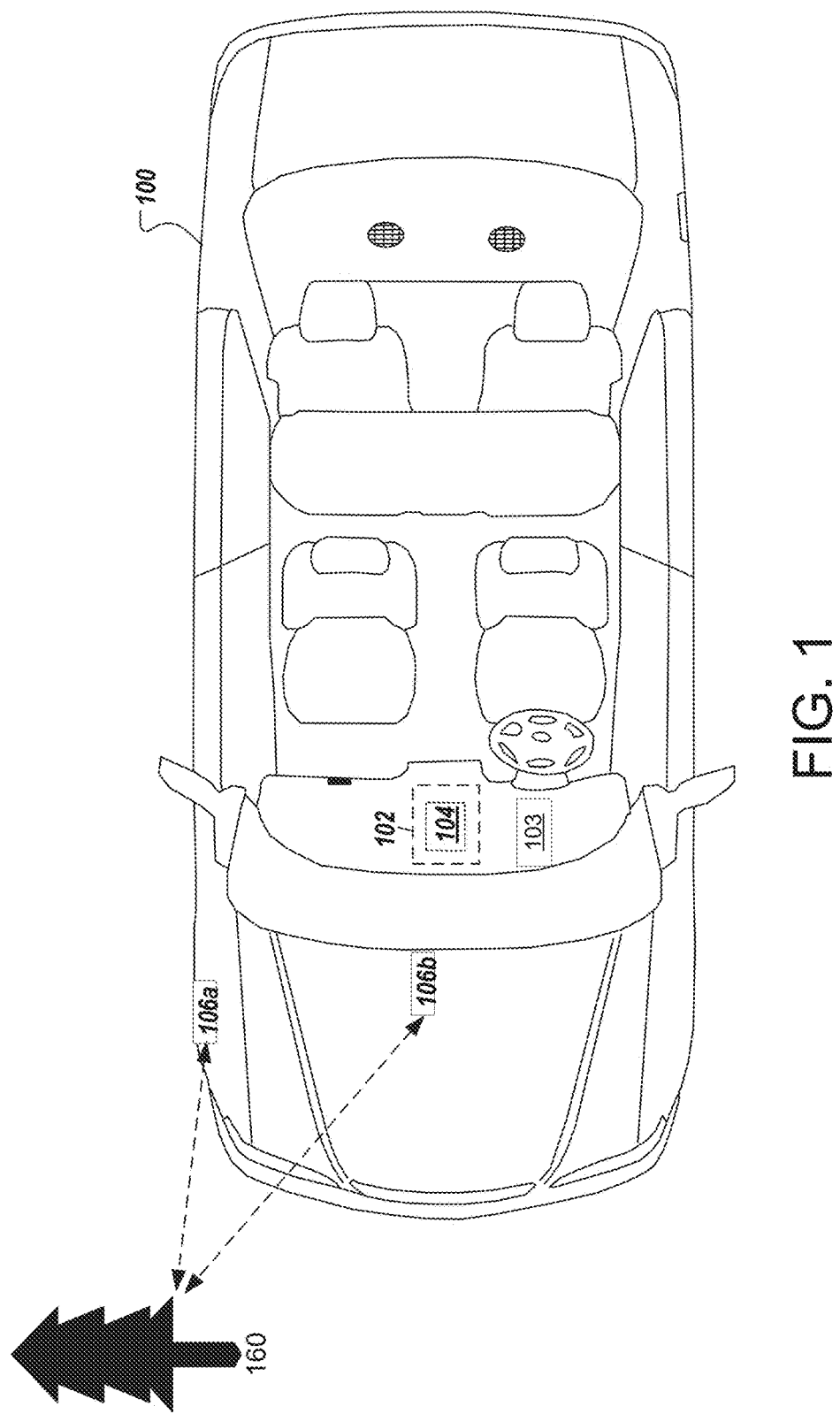
FIG. 1 is a diagram of a vehicle including a low-ghost association and target location system.

Referring to FIG. 1, a vehicle 100 (e.g., an autonomous automobile) is equipped with a low-ghost fusion/association and target location system 102 that detect objects (also referred to as targets) in its surroundings. Information about the location of targets in the vicinity of the vehicle 100 is used by a navigation system 103 to inform navigation and/or driving operations. For example, if an object such as a tree is detected to be within a threshold distance in front of the vehicle (100), the navigation system 103 can dynamically adjust the speed and/or direction of the vehicle 100 while the vehicle is moving to avoid a collision.

The low-ghost fusion/association and target location system 102 includes a controller 104 and two or more radar sensors 106a, 106b. The controller 104 processes data received from the radar sensors 106a, 106b to identify locations of targets 160 in the vicinity of the vehicle 100. The radar sensors 106a, 106b are located at distinct positions on the vehicle 100. In the example of FIG. 1, the radar sensor 106a is located on the roof of the vehicle 100 and the radar sensor 106b is located on the right side of the vehicle 100. The radar sensors 106a, 106b can also be located elsewhere on the vehicle, such as on the front of the vehicle 100, at a corner of the vehicle 100, or elsewhere.

In some examples, the controller 104 can be implemented in hardware, such as a processor, that resides in the vehicle 100 (e.g., in the dashboard of the vehicle 100). In some examples, the controller 104 can be implemented by a distributed or cloud-based processing system, and the vehicle 100 can include a communications component 110 (e.g., a cellular antenna or other type of communications component) to communicate with the distributed or cloud-based processing system.

The controller 104 of the low-ghost fusion/association and target location system 102 fuses the data from the radar sensors 106a, 106b to calculate locations of targets in the vicinity of the vehicle 100. Based on the calculated locations, the controller creates a map of the target locations, e.g., in three-dimensional (3-D) Cartesian space. In some radar systems, a target location may sometimes be calculated at a point where there are no true targets, e.g., due to factors such as noise and/or false alarms. These incorrectly calculated target locations are referred to as non-admissible ghosts, or sometimes simply as ghosts. Ghosts in a radar image result in an inaccurate map of the environment and can lead to undesirable performance. In the example of an autonomous vehicle, the presence of ghosts in a radar image can inhibit navigation, e.g., resulting in the vehicle being steered to avoid a perceived target that does not truly exist. In some radar systems, ghosts can be corrected over time with additional data collection (referred to as "multiple looks"). In the low-ghost fusion/association and target location system 102, ghosts can be removed from a map of target locations using data from a single point in time (referred to as "single look"). The low-ghost fusion/association and target location system 102 can thus provide a low-ghost or ghost-free map of target locations derived from a single look, which can enable the vehicle 100 to be safely and efficiently operated, e.g., in an autonomous or partially autonomous mode.

Although FIG. 1 depicts the low-ghost fusion/association and target location system 102 implemented in an automobile, the low-ghost fusion/association and target location system 102 can also be implemented in other types of vehicles, such as manned or unmanned land-based, air-based, or water-based vehicles. In some examples, the low-ghost fusion/association and target location system 102 can be implemented in a non-vehicle environment.

Figure 2:
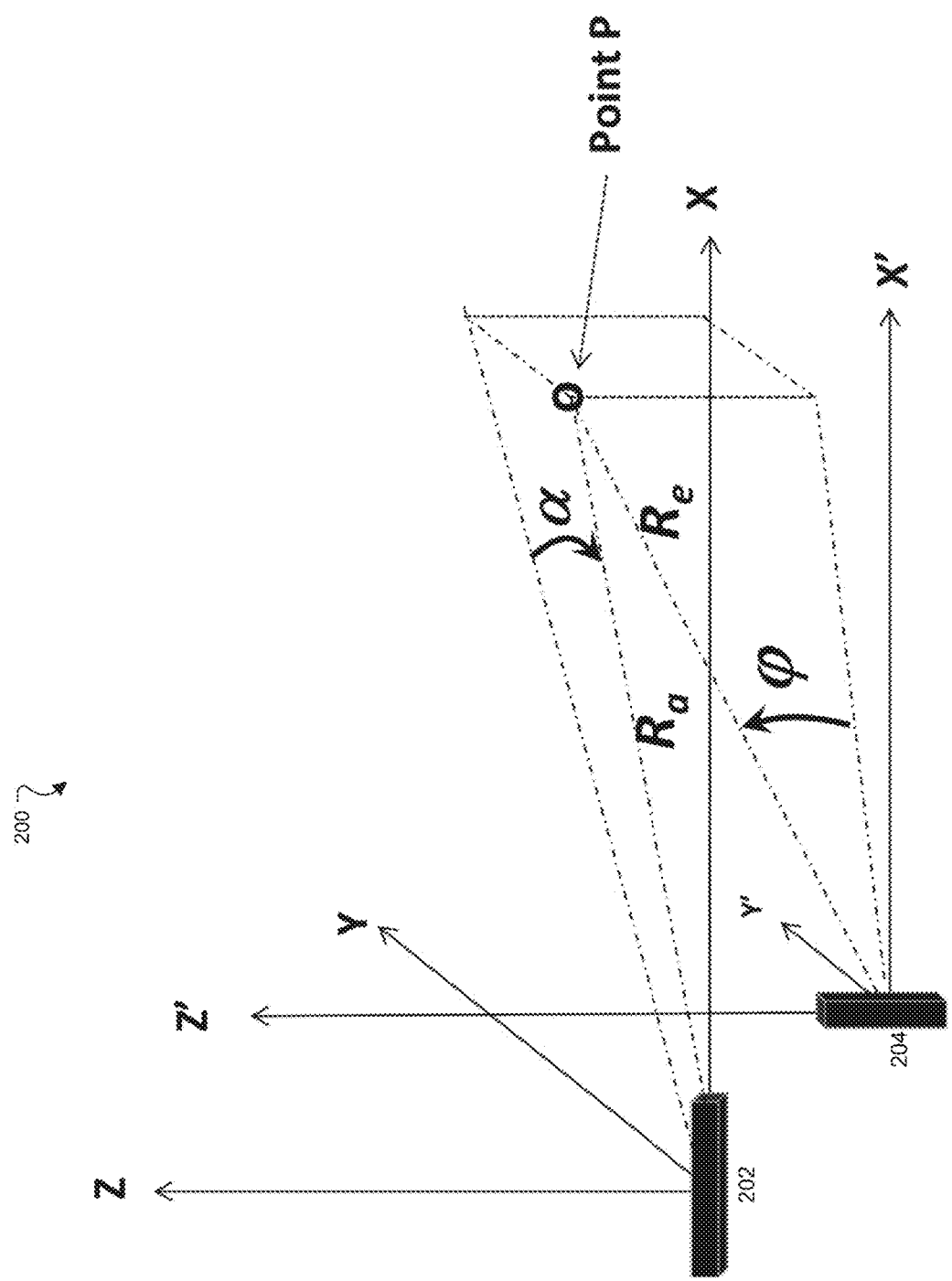
FIG. 2 is a diagram of two incomplete radar sensors of a low-ghost association and target location system.

FIG. 2 is a diagram of an example configuration of two incomplete radar sensors 202, 204 forming a Boolean radar system 200. The radar sensors 202, 204 are located at distinct positions and are orthogonally oriented, meaning that the sensor 202 is oriented to collect data in a direction perpendicular to the direction in which the sensor 204 is oriented to collect data. The radar sensors 202, 204 form part of a low cost, low physical cross section aperture Boolean radar design. Each radar sensor 202, 204 is a two-dimensional (2-D) sensor and each could be a sparse linear array with displaced phase centers. Each radar sensor is incomplete taken individually, meaning that one of the radar sensors (e.g., the radar sensor 202) measures a first range and a first spatial angle, while the other radar sensor (e.g., the radar sensor 204) measures a second range and a second spatial angle orthogonal to the first spatial angle. The configuration of the radar sensors 202, 204 with locations 106a and 106b in FIG. 1, have a small physical cross section, low weight, and low aerodynamic drag, making it suitable for consumer applications, e.g., a radio frequency (RF) imaging sensor for an autonomous vehicle.

Each radar sensor 202, 204 can have a single, wide beam transmission, with multiple simultaneous narrow beams formed on receipt of a signal. The radar sensors 202, 204 are not necessarily coherent with each other. The radar sensors 202, 204 can be coordinated with each other such that each radar sensor 202, 204 observes the same field of view (FOV) in the same short dwell time, where targets are assumed to be static with respect to the spatial resolution of the radar sensors 202, 204 for the duration of the dwell time. Each radar sensor 202, 204 can employ its own encoded transmit waveform (e.g., encoded in frequency and/or time) with an illumination beam that covers a wide FOV. The transmit waveform of the radar sensor 202 is orthogonal to the transmit waveform of the radar sensor 204. On reception of a signal, each radar forms simultaneous narrow receive beams by digitally sampling a low-cost linear sparse array.

Without loss of generality, let the radar sensor 202 be an azimuth radar formed from a horizontally oriented line array, and the radar sensor 204 be an elevation radar formed from a vertically oriented line array. The phase center of the azimuth radar 202 is located at the coordinates $[x_a\ y_a\ z_a]$ and the phase center of the elevation radar 204 is located at $[x_e\ y_e\ z_e]$. The phase center baseline between the two radars 202, 204 is given as [dx dy dz], where $dx=x_e-x_a$, $dy=y_e-y_a$, and $dz=z_e-z_a$. The principal axes for the coordinate systems of the radars 202, 204 (XYZ for the azimuth radar 202 and X'Y'Z' for the elevation radar 204) can be parallel. The azimuth radar 202 measures the signal $v_\alpha$ at point P at range $R_\alpha$ with azimuthal angle $\alpha$, where $\alpha$ is the small angle from the XZ plane to P. The elevation radar 204 measures the signal $v_e$ at point P at range $R_e$ with elevation angle $\phi$, where $\phi$ is the small angle from the X'Y' plane to P.

The azimuth radar 202 produces quantized estimates of range, angle, and received signal voltage $(R_\alpha Q, \alpha Q, v_\alpha)$ for each measurement with spatial resolution $(dR_\alpha, d\alpha)$. The elevation radar 204 produces quantized estimates of range, angle, and received signal voltage $(R_e Q, \phi Q, v_e)$ for each measurement with spatial resolution $(dR_e, d\phi)$. In general, the azimuth radar 202 and elevation radar 204 may have different range resolutions $(dR_\alpha \neq dR_e)$ and/or different angle resolutions $(d\alpha \neq d\phi)$. In the example of FIG. 2, let the azimuth radar 202 and elevation radar 204 have the same range resolution, $dR=dR_\alpha=dR_e$. The quantized estimates of range, angle, and received signal voltage $(R_\alpha Q, \alpha Q, v_\alpha)$ and $(R_e Q, \phi Q, v_e)$ are sometimes referred to as voltage triplets.

The non-linear mapping between the quantized spatial measurements $(R_\alpha Q, \alpha Q)$ and $(R_e Q, \phi Q)$ and each target position estimate at $[\hat{x}_t\ \hat{y}_t\ \hat{z}_t]$ are given by a series of four equations. Equation 1 places a target's location on a sphere centered at the phase center $[x_a\ y_a\ z_a]$ of the azimuthal radar with radius equal to the range estimate $R_\alpha Q$ of the azimuthal radar. Equation 2 places a target's location on a sphere centered at the phase center $[x_e\ y_e\ z_e]$ of the elevation radar with radius equal to the range estimate $R_e Q$ of the elevation radar. Equation 3 defines a target's y coordinate as a function of the phase center $[x_a\ y_a\ z_a]$ of the azimuthal radar and the estimates for range and angle ($R_\alpha Q$ and $\alpha Q$, respectively) of the azimuthal radar. Equation 4 defines a target's z coordinate as a function of the phase center $[x_e\ y_e\ z_e]$ of the elevation radar and the estimates for range and angle ($R_e Q$ and $\phi Q$, respectively) of the elevation radar.

$$(\hat{x}_t-x_\alpha)^2+(\hat{y}_t-y_\alpha)^2+(\hat{z}_t-z_\alpha)^2=R_\alpha Q^2 \quad (1)$$

$$(\hat{x}_t-x_e)^2+(\hat{y}_t-y_e)^2+(\hat{z}_t-z_e)^2=R_e Q^2 \quad (2)$$

$$(\hat{y}_t-y_\alpha)=R_\alpha Q \sin \alpha Q \quad (3)$$

$$(\hat{z}_t-z_e)=R_e Q \sin \phi Q \quad (4)$$

The association problem for the low-ghost fusion/association and target location system 300 is how to correctly associate, on a single look, each voltage triplet from the azimuth radar 202, $(R_\alpha Q, \alpha Q, v_\alpha)$, with each voltage triplet from the elevation radar 204, $(R_e Q, \phi Q, v_e)$ to identify admissible locations for a target. In particular, for any single target within the FOV of the radar sensors 202, 204, a noise-free measurement pair produces a unique quadruplet, or four-dimensional (4-D) spatial address, $(R_\alpha Q, \alpha Q, R_e Q, \phi Q)$. A noise-free measurement pair is a pair of voltage triplets, one voltage triplet corresponding to each of the radar sensor 202, 204, in which the values are not affected by noise. Each noise-free quadruplet is associated with an admissible target position.

Inversely, however, only a small fraction of all possible quadruplets of $(R_\alpha Q, \alpha Q, R_e Q, \phi Q)$ map to true targets present within the FOV of the radars 202, 204. The quadruplets that map to true targets constitute solutions of equations (1-4) with some finite error relative to a cost function. Other quadruplets that are not solutions of equations (1-4) are either non-admissible ghosts or are ghosts that are outside the FOV of the radars 202, 204. Some ghosts correspond to quadruplets that generate position estimates which exceed a cost function threshold. A cost function threshold establishes an upper bound for a generally weighted combination of two errors, one being Cartesian location error and the other being a voltage discrepancy error. Accepted targets have a cost function below the upper bound, indicating that the two sensors have high probability of measuring the same target. Separate targets well within the FOV would have a high probability of exceeding the cost function threshold. Some ghosts are 3-D position estimates that are inside the FOV of the radars 202, 204 but are non-admissible solutions. For instance, in scenarios that are free of thermal noise, the ghosts that are non-admissible solutions can form due to spatial quantization noise from the finite resolutions (dR, $d\alpha$, $d\phi$), and the phase center baseline between radars.

Ghosts that represent positions outside the FOV of the radars 202, 204 can be readily identified and eliminated because these positions fall outside of the Cartesian boundary of the FOV. Additional processing can be performed to identify ghosts that are non-admissible solutions that fall within the FOV of the radars 202, 204.

Figure 3:
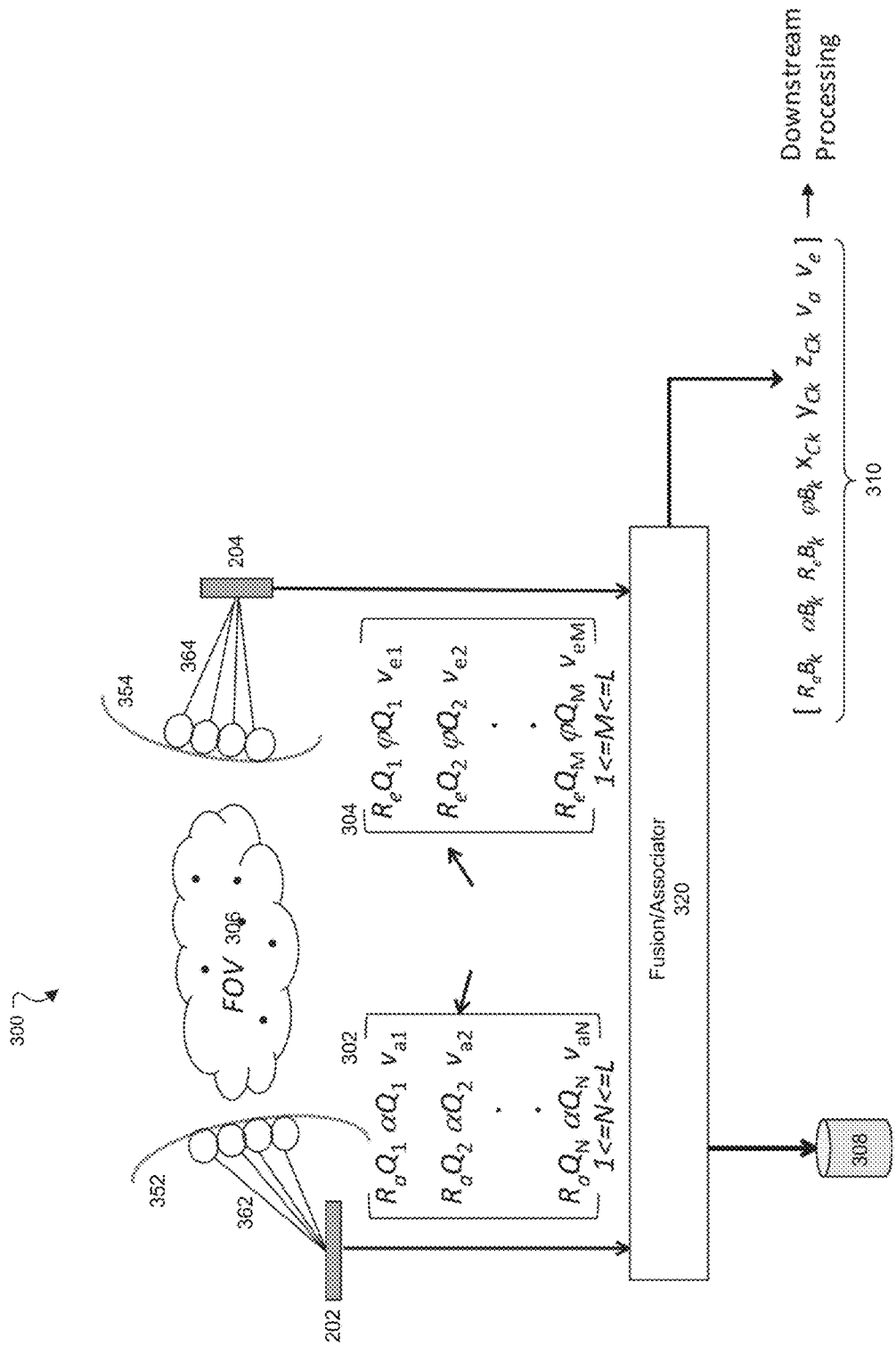
FIG. 3 is a diagram of two incomplete sensors forming a low-ghost association and target location system.

Referring to FIG. 3, in the low-ghost fusion/association and target location system 300, the azimuth radar 202 and the elevation radar 204 each generates a single, wide beam transmission 352, 354, respectively, with multiple simultaneous narrow beams 362, 364, respectively, formed on receipt of a signal. The voltage triplets received by the azimuth radar 202 and the elevation radar 204 ($(R_\alpha Q, \alpha Q, v_\alpha)$ 302 and $(R_e Q, \phi Q, v_e)$ 304, respectively) are fed to a fusion/associator 320. For instance, the associator can be implemented by the controller 104 of FIG. 1. There are a total of L targets 306 in the FOV of the azimuth radar 202 and the elevation radar 204. The fusion/associator 320 converts each pair of voltage triplets from the azimuth radar 202 and elevation radar 204 into a 4-D spatial address and identifies and removes ghosts from the resulting set of 4-D spatial addresses through a ghost channel 308.

Figure 4:
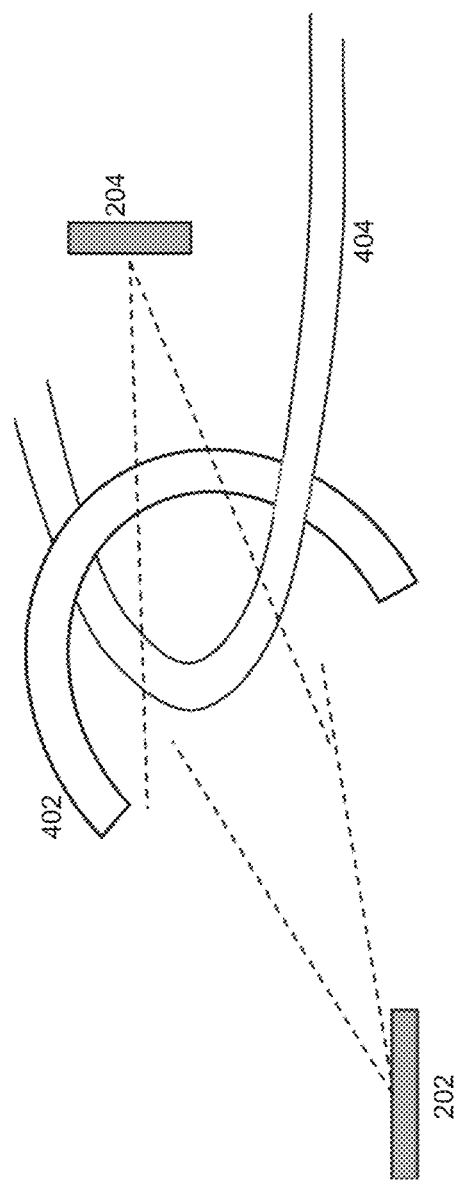
FIG. 4 is an illustration of a non-admissible ghost.

FIG. 4 depicts identification of a non-admissible ghost. The voltage triplets received by the azimuth radar 202 and the elevation radar 204 and the known resolution of each radar 202, 204 define a 3-D ring for each sensor representative of the possible locations for a target corresponding to the respective voltage triplet. In particular, the azimuth radar 202 voltage triplet defines a vertically oriented iso-$(R_\alpha Q, \alpha Q, v_\alpha)$ ring 402 of dR thickness and $d\alpha$ azimuthal span. The elevation radar 204 voltage triplet defines a horizontally oriented iso-$(R_e Q, \phi Q, v_e)$ ring 404 of dR thickness and $d\phi$ elevation span. Each ring represents possible target locations based on a voltage triplet received by the corresponding radar, taken in isolation (e.g., without consideration of the voltage triplet received by the other radar). If the target were a true target, both radars 202, 204 would detect the target in the same location, and the rings 402, 404 would intersect at the location of the true target. If the target were a non-admissible ghost, the rings 402, 404 would not intersect. Thus, by determining the intersection of the rings 402, 404 defined by the voltage triplets received by the azimuth radar 202 and the elevation radar 204, the 4-D spatial address corresponding to a given pair of voltage triplets can be identified as a non-admissible ghost.

Referring again to FIG. 3, to identify non-admissible ghosts in the set of 4-D spatial addresses, the fusion/associator 320 employs multiple filters. A first filter is a dictionary that maps valid 4-D spatial addresses to target voxel centers. A voxel is the smallest volume in 3-D Cartesian space, with its volume depending on the resolution of the azimuth radar 202 and elevation radar 204. A second filter stipulates that a function of the joint received voltages or amplitudes satisfies a threshold. Some example functions include a product or a difference of the received voltages or amplitudes. When the second filter function value is below a threshold, and when the first geometry based filter is satisfied, then a valid target is declared. The two filters in series reject 4-D spatial addresses that correspond to non-admissible ghosts, those that do not belong to valid targets, that fall outside the FOV, and those that correspond to noise filled voxels. The output of the fusion/associator 320 is a detection vector 310 that includes a 3-D position estimate of valid target voxel centers and corresponding signal voltages, as well as copies of the valid 4-D spatial address.

Figure 5:
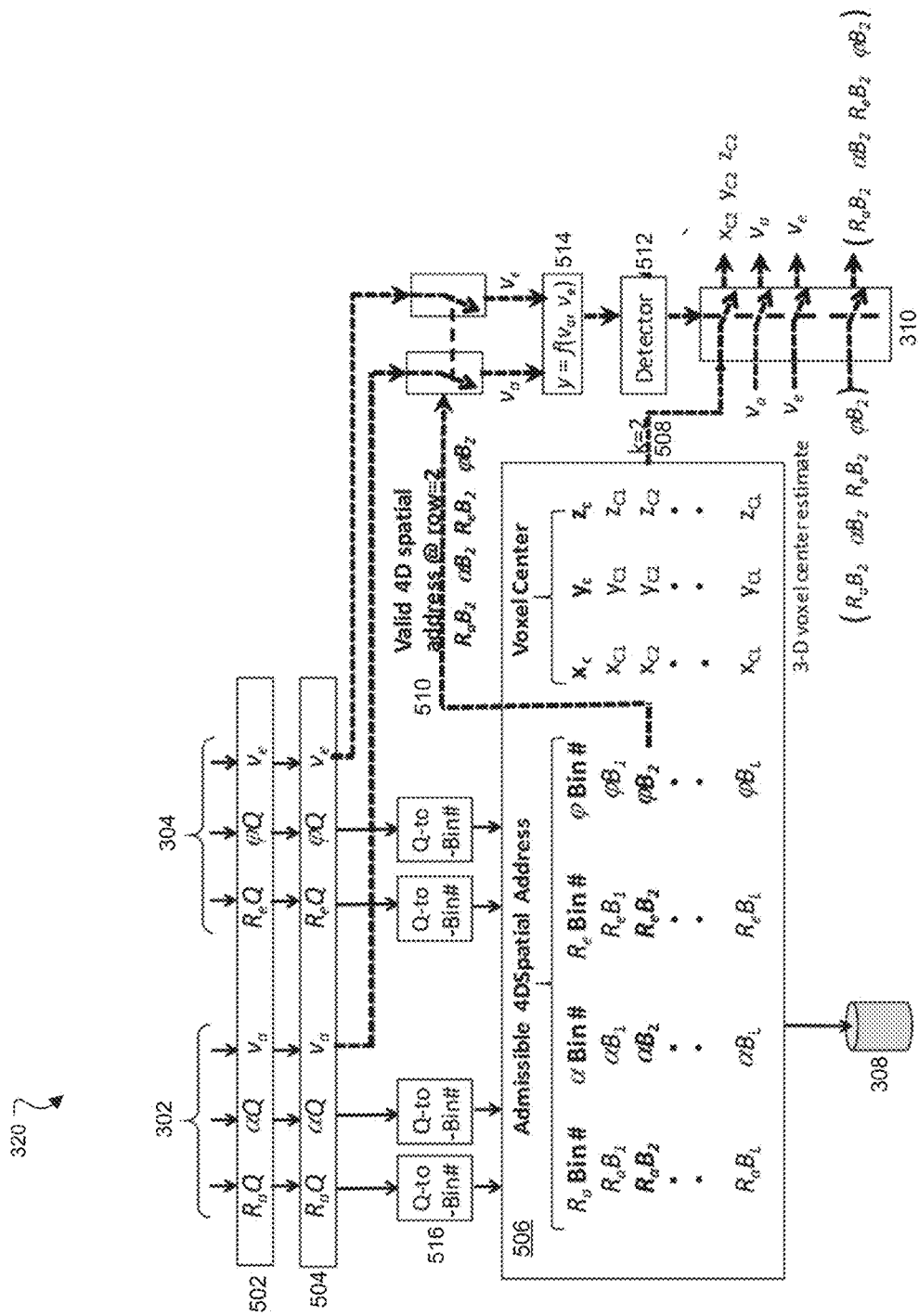
FIG. 5 is a diagram of a sensor fusion and association method of a low-ghost association and target location system.
Figure 6:
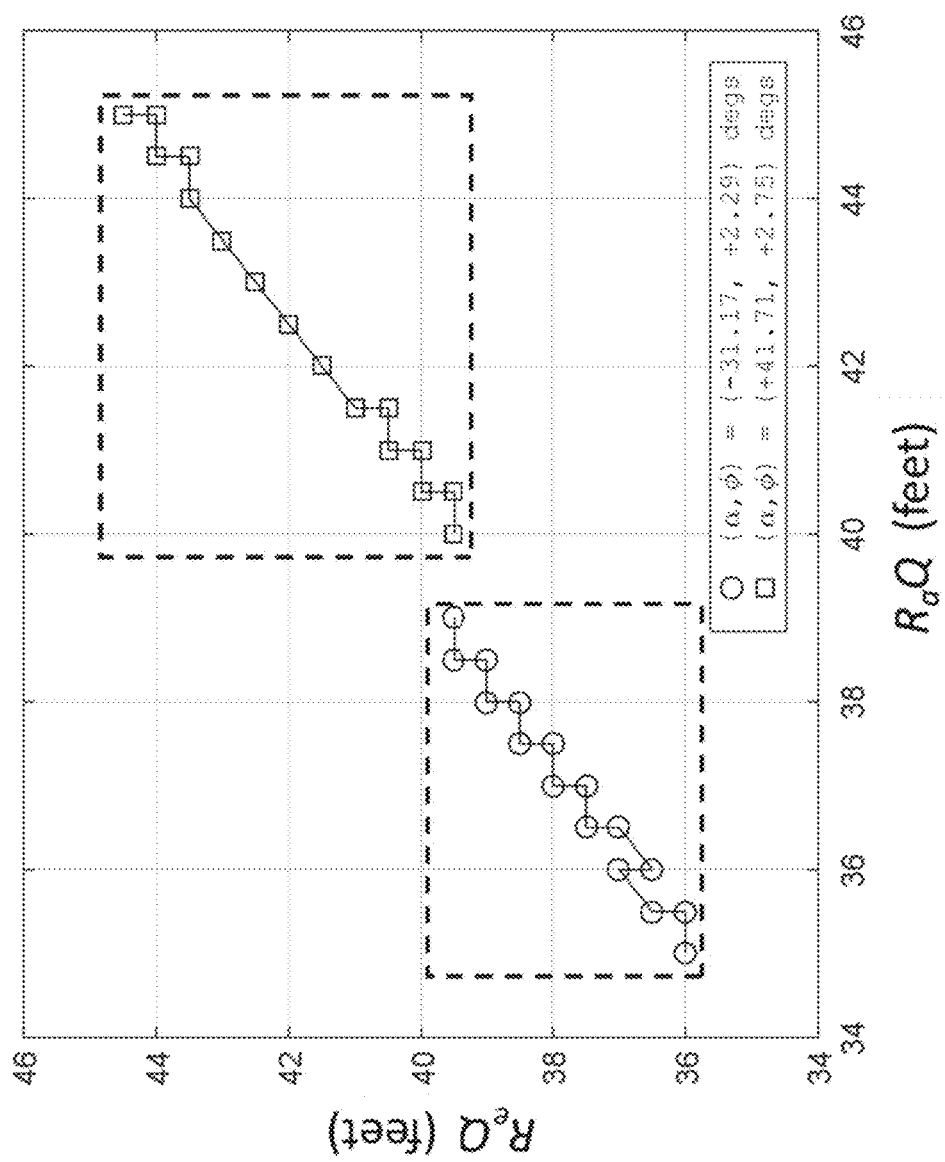
FIG. 6 is an association map for two fixed beam pairs.

Referring to FIG. 5, in the fusion/associator 320, the voltage triplets 302, 304 are received from the azimuth radar 202 and the elevation radar 204 and form a set 502 of voltage triplet pairs. Each voltage triplet pair optionally undergoes an independent detection process 502. The detection pre-screening process discards any azimuth radar 202 voltage triplet, $(R_\alpha Q, \alpha Q, v_\alpha)$, for which $|v_\alpha|$ is less than a threshold for a desired azimuthal detection probability, $P_{da}$; and discards any elevation radar 204 voltage triplet, $(R_e Q, \phi Q, v_e)$, for which $|v_e|$ is less than the threshold for the desired elevation detection probability, $P_{de}$. In some examples, the azimuthal detection probability is the same as the elevation detection probability; in some examples, the two probabilities are different. A second prescreen 504 performs a range screen for a given pair of beams $(\alpha Q, \phi Q)$ as shown in FIG. 6. The output of 504 is a pair of voltage triplets which forms a candidate quantized spatial address. After prescreening, each candidate quantized spatial address 504 is converted to a compact, minimum dynamic range, binary address 516 by a table lookup for each spatial dimension. The result is a space conserving, compact 4D binary spatial address $(R_\alpha B, \alpha B, R_e B, \phi B)$.

The dictionary 506 is a filter that screens the 4-D spatial addresses 516. Admissible 4-D spatial addresses, $(R_\alpha B, \alpha B, R_e B, \phi B)$, and the corresponding voxel centers are loaded in the dictionary 506. By comparing each 4-D spatial address in the set 516 with the 4-D spatial addresses in the dictionary 506, the 4-D spatial address can be identified as admissible or non-admissible. 4-D spatial addresses identified as non-admissible, which are equivalent to non-admissible ghosts, are discarded through the ghost channel 308. Any 4-D spatial addresses corresponding to locations outside the FOV of the azimuth radar 202 and elevation radar 204 are also discarded through the ghost channel 308. For each admissible 4-D spatial address in the set 516, the dictionary 506 returns the 3-D voxel center 508 $[x_c, y_c, z_c]$ associated with the 4-D spatial address.

The range support pre-screening process is specific for each $(\alpha Q, \phi Q)$ beam pair 502. For a given $(\alpha Q, \phi Q)$ beam pair, only a subset of the support ranges $(R_\alpha Q, R_e Q)$ are admissible, FIG. 6. The output of 504 is a range pre-screened pair of voltage triplets fed to the dictionary 506.

For illustration, it is convenient to reduce the 4-D spatial address to two dimensions. Let AzIndex be a one-dimensional mapping of the two-dimensional binary range and angle, $R_\alpha B$ and $\alpha B$, AzIndex=$(R_{\alpha B}-1) \times \max(\alpha B) + \alpha B$. Similarly, let ElIndex=$(R_e B-1) \times \max(\phi B) + \phi B$. Consider a Boolean radar architecture with a common FOV that contains approximately 148,000 voxels spanning approximately 57 $R_\alpha B$ bins, 56 $R_e B$ bins, 344 $\alpha B$ bins, and 9 $\phi B$ bins with corresponding spatial resolution of dR=0.5 feet, $d\alpha$ and $d\phi$ are 4 and 8 milliradians respectively with a phase center baseline of $[d_x, d_y, d_z]=[-0.3, 1.5, 0.2]$. Referring to FIG. 6, using this Boolean radar configuration, select one beam pair at $(\alpha, \phi)=(-31.17°, +2.29°)$, and a second beam pair at $(\alpha, \phi)=(-41.71°, +2.75°)$. The admissible $(R_\alpha Q, R_e Q)$ pairs from the dictionary 506 are shown as circles and squares, respectively. The range sub-support for each beam pair allows the data stream fed to the dictionary 506 to be pre-filtered by range bounding boxes for each unique beam pair.

Figures 7A, 7B:
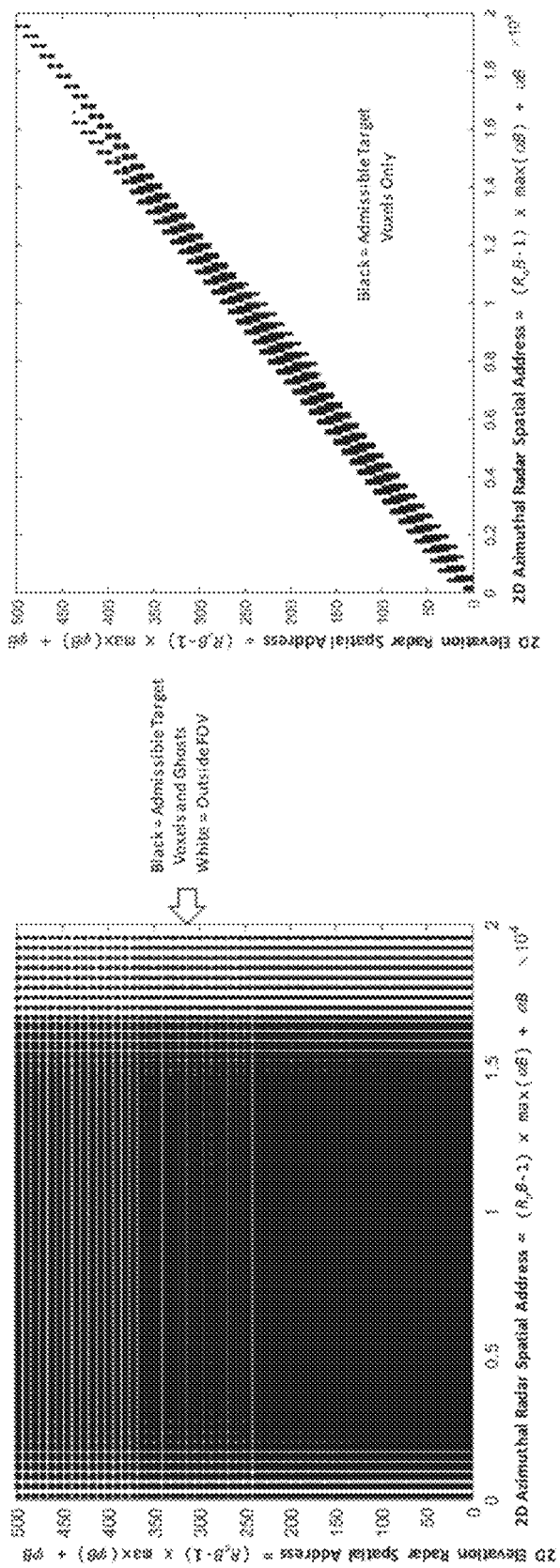
FIG. 7A is an association map showing 4-D associations for admissible target voxels and ghosts.
FIG. 7B is an association map showing 4-D associations for admissible target voxels.
Figures 7C, 7D, 7E:
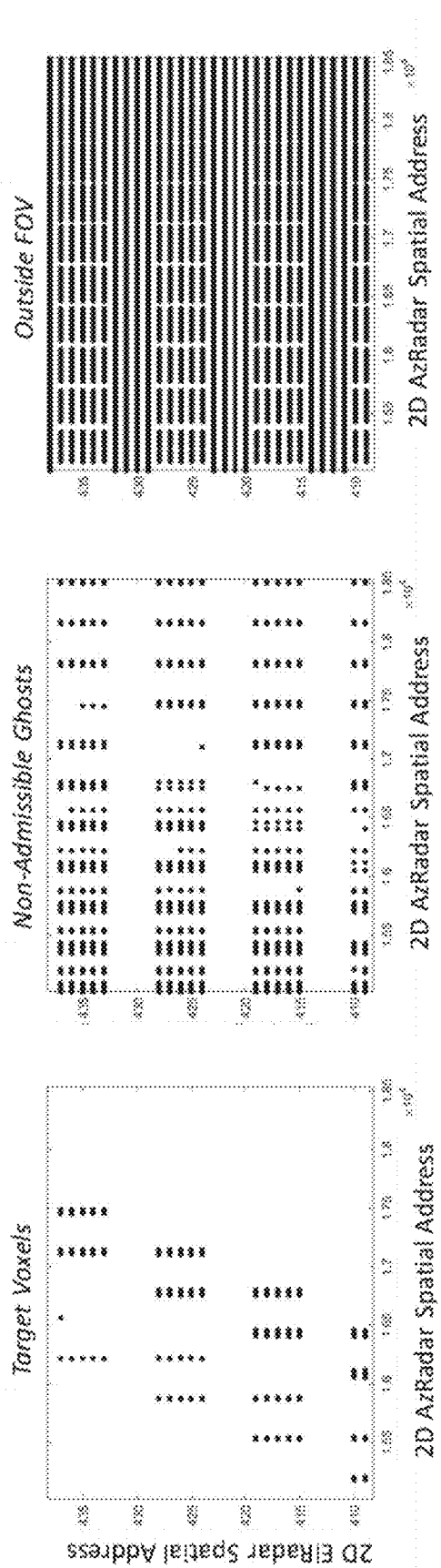
FIGS. 7C, 7D, and 7E are zoomed in views of FIG. 6 showing 4-D association maps of target voxels, non-admissible ghosts, and spatial addresses outside the field of view of the radar sensors, respectively.

The dictionary 506 is a sparse association map between admissible 4-D spatial addresses and 3-D target voxel centers. Referring to FIG. 7A, using the same Boolean radar configuration as was used for FIG. 6, the 4-D spatial address association mappings for both admissible target voxels and non-admissible ghosts are shown in black while the 4-D spatial addresses outside the FOV are shown in white. FIG. 7B shows 4-D spatial address association mapping for only the admissible target voxels as a black colored region. Removing non-admissible ghosts leads to a much smaller number of admissible target voxels, which are stored by the dictionary 506 and may be identified as target locations. FIG. 7C, 7D, 7E are zoomed in plots of a small volume of the plot of FIG. 7A showing the three complementary 4-D association maps: targets (FIG. 7C), non-admissible ghosts (FIG. 7D), and addresses outside the FOV of the radar sensors (FIG. 7E).

Referring again to FIG. 5, each admissible 4-D spatial address 510 that is identified as valid is processed by a second filter 512, that qualifies target association with a 3-D voxel detection on a single look. The second filter 512 evaluates a function 514 of the received voltages, $f(v_\alpha, v_e)$ for each admissible 4-D spatial address 510 against a threshold for a desired detection probability $P_d$. In some cases, for Boolean radar, $f(v_\alpha, ve)$ may be the joint voltage product of the received voltages $(v_\alpha, v_e)$, e.g., $f(v_\alpha, v_e)=|v_\alpha||v_e|$, or a pre-detected Boolean voltage product, and the threshold is a minimum value for the voltage product. In these cases, the second filter 512 is satisfied when the voltage product exceeds the minimum value. In some cases, $f(v_\alpha, v_e)$ may be the absolute difference of weighted received voltages, $d_x=w_a|v_\alpha|-w_e|v_e|$, where $w_a$ and $w_e$ can depend on per-radar gain parameters, and the threshold is a maximum value for the difference. For instance, at small baselines, the received voltages can be weight correlated. In these cases, the second filter 512 is satisfied when the difference is less than a maximum value. The second filter condition can be merged with a primary general voltage-pair condition into the aforementioned general function, $f(v_\alpha,$ $v_e$). In a merge of two voltage dependent conditions, let $f_1(v_\alpha, v_e)=|v_\alpha||v_e|$ and $f_2(v_\alpha, v_e)=|v_\alpha|-|v_e|$ for small baselines. Then the generalized function $f_g(v_\alpha, v_e)$ requires that both $f_1(v_\alpha, v_e)$>Threshold1 and $f_2(v_\alpha, v_e)$<Threshold2. The generalized function $f_g(v_\alpha, v_e)$ thus enjoys lower false alarms than either function alone. The 4-D spatial addresses 514 that satisfy the second filter 512, and the received voltages associated with each address 514, are output from the second filter 512.

The fusion/associator 320 outputs a detection vector 310 corresponding to each 4-D spatial address 514 that satisfies both the dictionary 506 and the second filter 512. The detection vector 310 includes the 3-D voxel center 508 output from the dictionary 506, the received voltages, and the 4-D spatial address. The detection vector 310, ($x_c$, $y_c$, $z_c$, $v_\alpha$, $v_e$, $R_\alpha B$, $\alpha B$, $R_e B$, $\phi B$), is output from the fusion/associator 320 for downstream processing, e.g., for constant false alarm rate (CFAR), Doppler, and/or other signal processing.

The approaches described here can be applied to multiple look target association and detection. Consider an example of N looks in a coherent processing interval (CPI). Further assume a static scene for simplicity. For look k of N looks, a set of admissible 4-D spatial addresses are qualified by the dictionary with a corresponding set of voltage pairs ($v_{\alpha k}$, $v_e$). One substantiation sums voltage pairs coherently, or non-coherently, across N for each unique admissible 4-D spatial address, yielding ($v_{\alpha CPI}$, $v_{eCPI}$). This is followed by formation of the sufficient statistic and detection with a threshold set for $P_d$ given N looks. More general summations are possible with per-look weights applied to each sensor's voltage where these weights depend on voltage variations from some statistic of each. Statistics can be sample mean voltages learned in recent previous measurements, else in the present N looks. Per-look weights, $w_k$, can also depend on the per-look difference, $d_v=|v_\alpha|-w|v_e|$ to accommodate de-weighting of summations due to unexpected decorrelation of sensor echo amplitudes.

In an example, two radar reflective targets were imaged using Boolean radar to develop a baseline for the spatial resolution performance of the Boolean radar. The azimuth radar 202 had a spatial resolution of $dR_\alpha=0.5$ feet and $d\alpha=4$ milliradians, while the elevation radar 204 had a spatial resolution of $dR_e=0.5$ feet and $d\phi=4$ milliradians with a phase center baseline of [dx, dy, dz]=[−0.3, 1.5, 0.2].

Figure 8B:
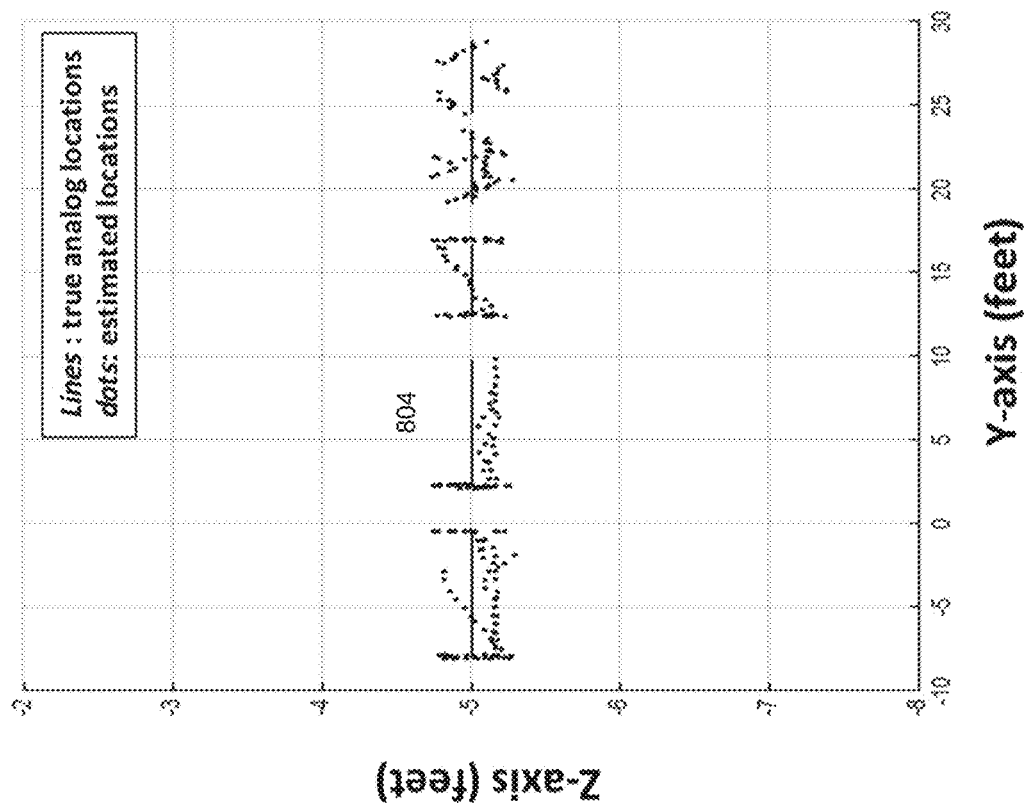
FIGS. 8A and 8B are a YX-image and a YZ-image, respectively, of a target lying in a horizontal plane imaged using a single look, low-ghost association and target location system.
Figure 8A:
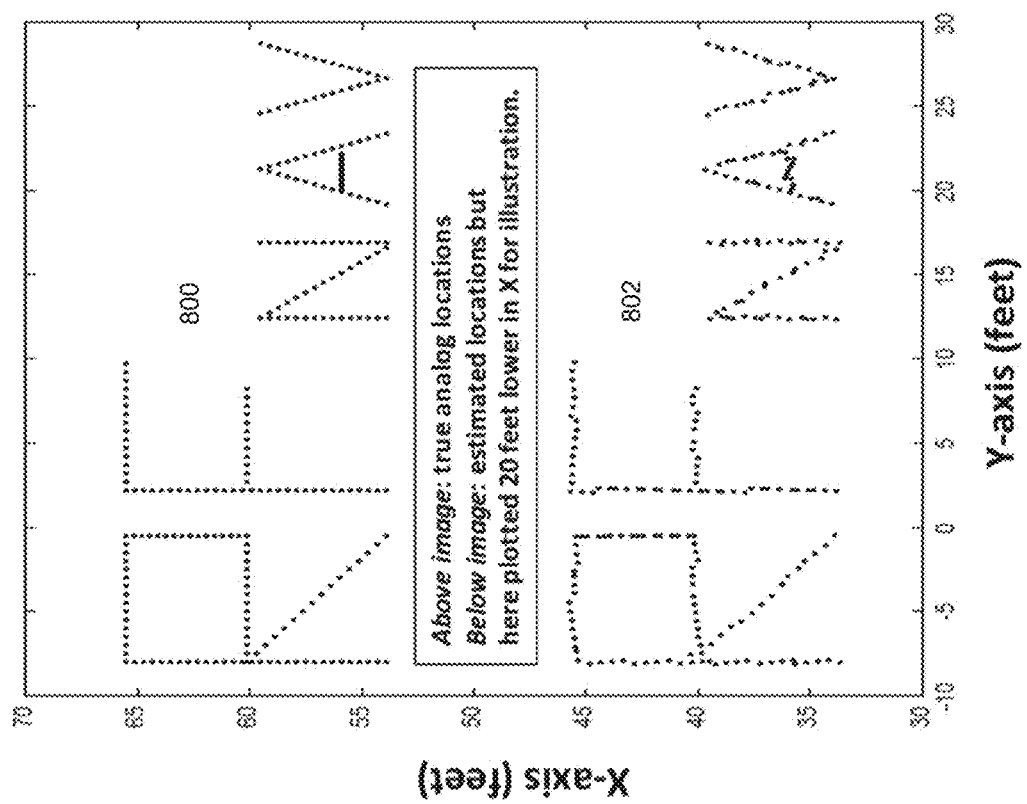

Referring to FIGS. 8A and 8B, in an example, the radar reflective target was the letters "RFNAV" lying in a horizontal plane (z=−5 feet) at ranges from 54 to 66 feet with a cross-range (y-axis) spread of 37 feet, as shown at 800. The FOV was set 2 feet beyond the true spatial extent in each dimension. The Boolean radar's estimates of the target positions are depicted as shifted 20 feet in the negative x direction relative to the target's analog truth for ease of comparison. FIG. 8A shows an YX-image 802 of the target. The YX-image 802 is at the theoretical limit for this high-resolution Boolean Radar with single-look association. This single-look image is free of ghosts generated by radar-to-radar miss-associated target detections and the image has no distortion beyond resolution limits. FIG. 8B shows an YZ-image 804 of the same target 800. Analog truth is shown as lines and target estimates are shown as dots. The YZ-image 804 is at the theoretical limit for this high-resolution Boolean Radar with novel single-look association.

Figure 9B:
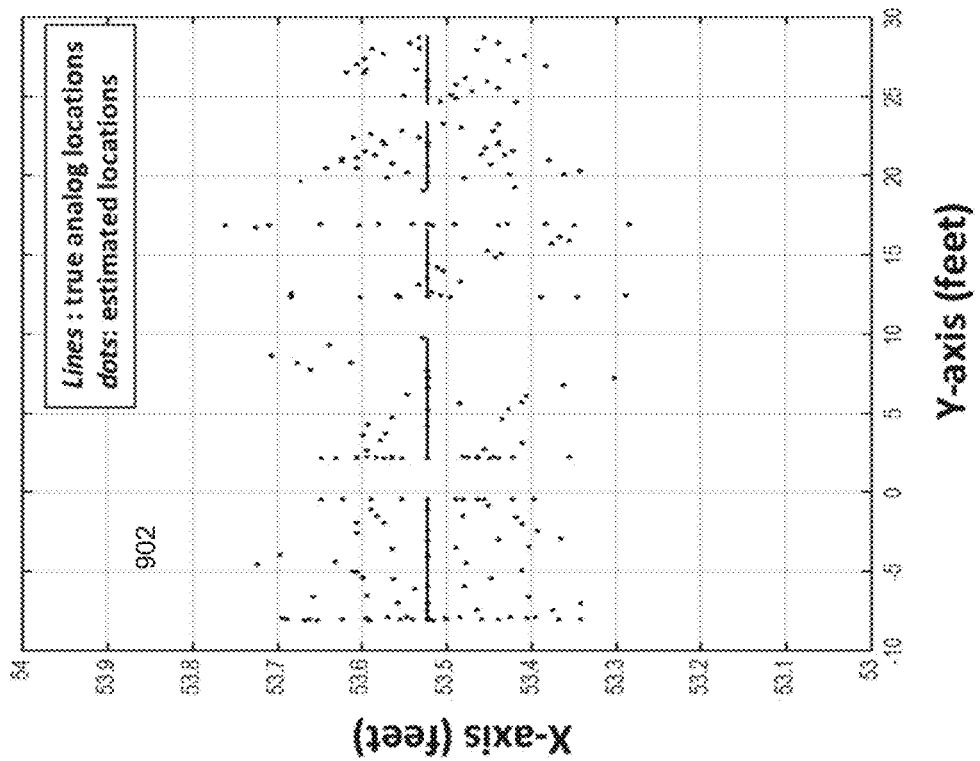
FIGS. 9A and 9B are a YZ-image and a YX-image, respectively, of a target lying in a vertical plane imaged using a single look, low-ghost association and target location system.
Figure 9A:
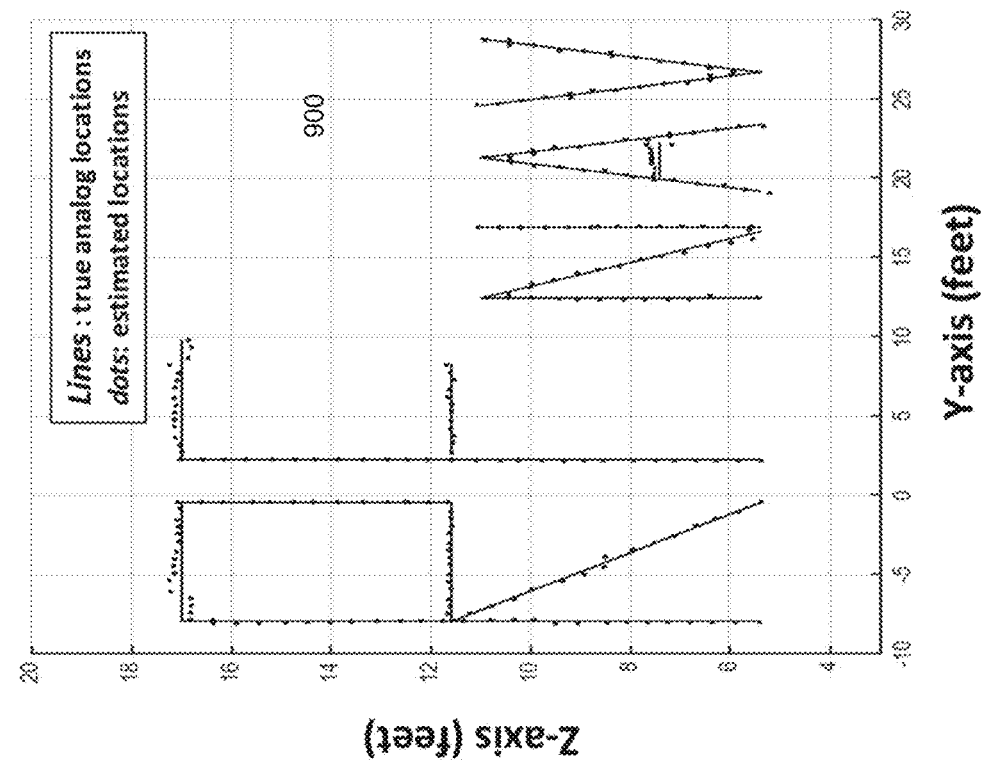

Referring to FIGS. 9A and 9B, in an example, the radar reflective target was the letters "RFNAV" laying in a vertical plane (x=53.56 feet) at ranges from 54 to 62 feet with a cross-range (y-axis) spread of 37 feet. The FOV was set 2 feet beyond the true spatial extent in each dimension. The target's analog truth is shown as lines and the Boolean radar's estimates of the target positions are shown as dots in both a YZ-image 900 (FIG. 9A) and a YX-image 902 (FIG. 9B). The YZ-image 900 appears distorted because the dimensions of the axes are not equal, but close inspection along the y-axis indicates high image accuracy. The YX-image 902 is at the theoretical limit for this novel high-resolution Boolean Radar with novel single-look association.

The approaches described here can reduce the role of measurement noise and radio frequency (RF) artifacts in corrupting the true targets in an image formed with single look data. Sources of RF artifacts can include, e.g., thermal noise (false alarms), multipath, sidelobes in spatial dimension, back lobes, RF/IF (intermediate frequency) analog channel cross-talk, external interference, and/or other artifacts, all before digital conversion. As an example, consider the extreme case of zero real targets contained in the FOV with only thermal noise present in every measurement. Further assume that the pre-screen detection processes are turned off so that all of the noisy measurements are presented to the dictionary 506. Thermal noise generated false alarms form a random, uniformly distributed set of 2-D spatial address in each radar. Since the two radars have independent noise processes, the probability that a pair of random, uniformly distributed, 2-D spatial addresses forming an admissible 4-D spatial address is the likelihood that the address appears in the dictionary 506 multiplied by the square of the false alarm probability. For the scenario of a FOV containing a maximum of L possible target voxels with N maximum possible unique pairs of ($R_\alpha Q$, $\alpha Q$) and M maximum possible unique pairs of ($R_e Q$, $\phi Q$), with zero real targets present, the probability of an admissible address forming, given the generation of a thermal noise 4-D spatial address ($R_\alpha Q$, $\alpha Q$, $R_e Q$, $\phi Q$), is L/NM. For a common FOV with 1000 range bins each for $R_\alpha Q$, or $R_e Q$ bin, 400 $\alpha Q$ bins and 200 $\phi Q$ bins, the probability of an admissible 4-D spatial address given the thermal noise generated 4-D spatial address is $L/NM<2\times10^{-3}$, where N=(1000)(400), M=(1000)(200), and L is upper-bounded by L<(2)(1000)(400)(200). In addition to the dictionary removing all thermal noise that generates non-admissible ghosts, the second filter stipulates that the sufficient statistic of the thermal noise generated voltages, $f(v_\alpha, v_e)$, exceeds a threshold, further reducing the probability of false alarms. For multiple looks in a static scene, thermal noise generated artifact probabilities are further reduced for the condition of m detections in n multiple looks.

There are two types of ghosts that can be caused by false alarms in a Boolean radar pair. The first type of ghost is the result of incorrectly associating an alarm occurring in a measurement bin of one radar with a similar alarm in the other radar. These ghosts, referred to as paired alarms, occur with low probability defined by the product of two false alarm probabilities ($P_{fa}$). A typical $P_{fa}$ per radar, such as $10^{-4}$, produces a radar-to-radar alarm-pair just once in 100 million pairs. The second type of radar-to-radar ghost is caused by false alarms in one radar combined with target detections in the other (and vice versa), and this type is much more common. Each of these ghosts is the result of incorrectly associating an alarm occurring in a measurement bin of one radar with a target detection in a bin of the other radar. An alarm-by-target pair occurs with higher probability than the alarm-pair, since each occurs with a probability given by the product of a false alarm probability and a detection probability ($P_d$). With $P_{fa}=10^{-4}$ per radar and $P_d$ near unity per radar, these radar-to-radar alarm-target pairs occur once in 10,000 attempted pairs.

Figure 10A:
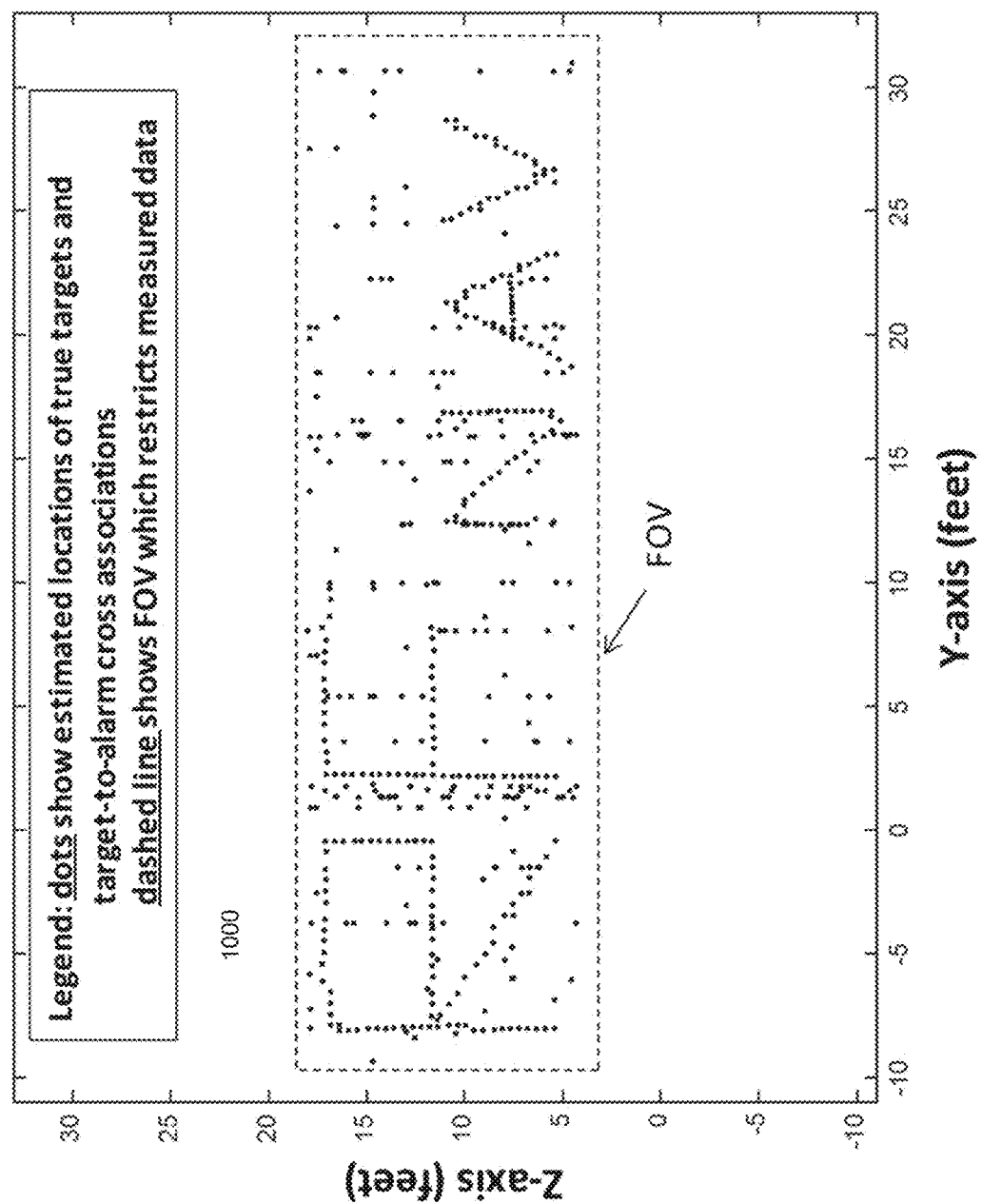
FIG. 10A is a YZ image of a target lying in a vertical plane, imaged without the use of a single look, low-ghost association and target location system.

Referring to FIG. 10A, certain ghosts arise due to false alarms in a Boolean radar. A target is shaped by the set of letters "RFNAV" and lies in a vertical plane at a range of 54 feet and beyond. The letters are made of radar detectable material, and sized to span 12 feet in the vertical (Z), 37 feet in cross-range (Y), and just 2 inches in range (X). In a YZ-image 1000 of the target, the dots show estimated locations of true targets and target-to-alarm cross associations. The dashed line shows the FOV which restricts the measured data. This single-look YZ-image shows that there are many ghosts generated by target-to-alarm cross associations that occur in a Boolean radar. A Boolean radar generates still more ghosts caused by target-to-target cross associations; but these ghosts are not shown in FIG. 10A, which illustrates just the locations of target-to-alarm ghosts. The ghost-based errors of FIG. 10A can be much worse when a larger FOV is used to search, detect, and/or image objects in a larger volume. Especially in the Y and Z axes, the location of ghosts produced by these alarm-to-target cross associations can be quite distant from the actual target locations. Depending on the baseline separation between radars, the X-location of a ghost produced by an alarm-to-target cross association may have a smaller separation from the X-location of the target that produced that ghost. The fusion/associator herein has the ability to eliminate the types of ghosts illustrated in FIG. 10A, as well as ghosts not shown in the figure, thus improving the imaging performance of the radar.

Figure 10B:
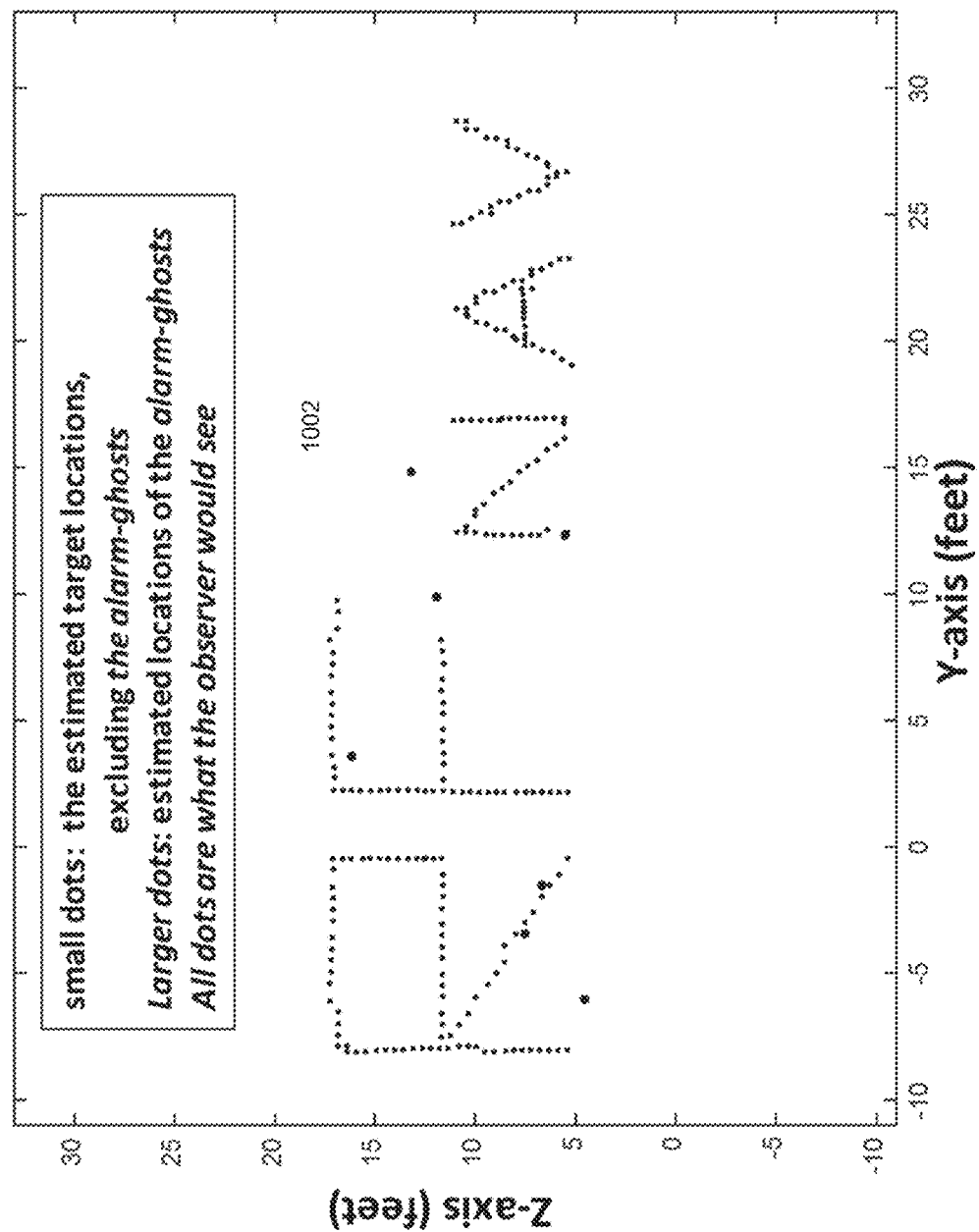
FIGS. 10B and 10C are a YZ-image and a YX-image, respectively, of a target lying in a vertical plane, imaged using a single look, low-ghost association and target location system.

Referring to FIG. 10B, the same data that were used to generate the image in FIG. 10A was processed using the fusion/associator described here to obtain a YZ-image 1002, eliminating most of these target-to-alarm ghosts as well as all of the target-to-target ghosts. This single-look YZ-image is entirely free of target-to-target cross associations, and has just a few target-to-alarm cross associations ghosts (here only 7 ghosts, compared to approximately 400 ghosts in FIG. 10A). Moreover, while these few ghosts would occur in increasing numbers in a still larger FOV, they would be far less in number and much less confusing for image interpretation, as compared with the degradation of the ghosts that would be presented to the fusion/associator in a larger FOV. Since a larger FOV is often used to search, detect, and image objects residing in a larger volume, the fusion/associator provides an advantage in its ability to reduce ghosts to a minimal pixel set with respect to desired target imaged pixels.

The fusion/associator described here is operating at the theoretical limit, given just the measurements provided, for the following reasons. First, the image is entirely free of target-to-target cross associations. Lacking this ghost-elimination capability the image would otherwise be less useful, because such ghosts would completely distort each portion of a target, except possibly in very sparse scenes of objects with little extent. But, the fusion/associator removes these target-to-target ghosts without removing target pixels. The fusion/associator also performs at the theoretical limit regarding the other ghosts, e.g., the alarm-to-target ghosts, because the only ghosts the fusion/associator cannot eliminate are located at valid target locations. The few ghosts remaining after processing by the fusion/associator are unavoidable if all of the targets are to be imaged.

Figure 10C:
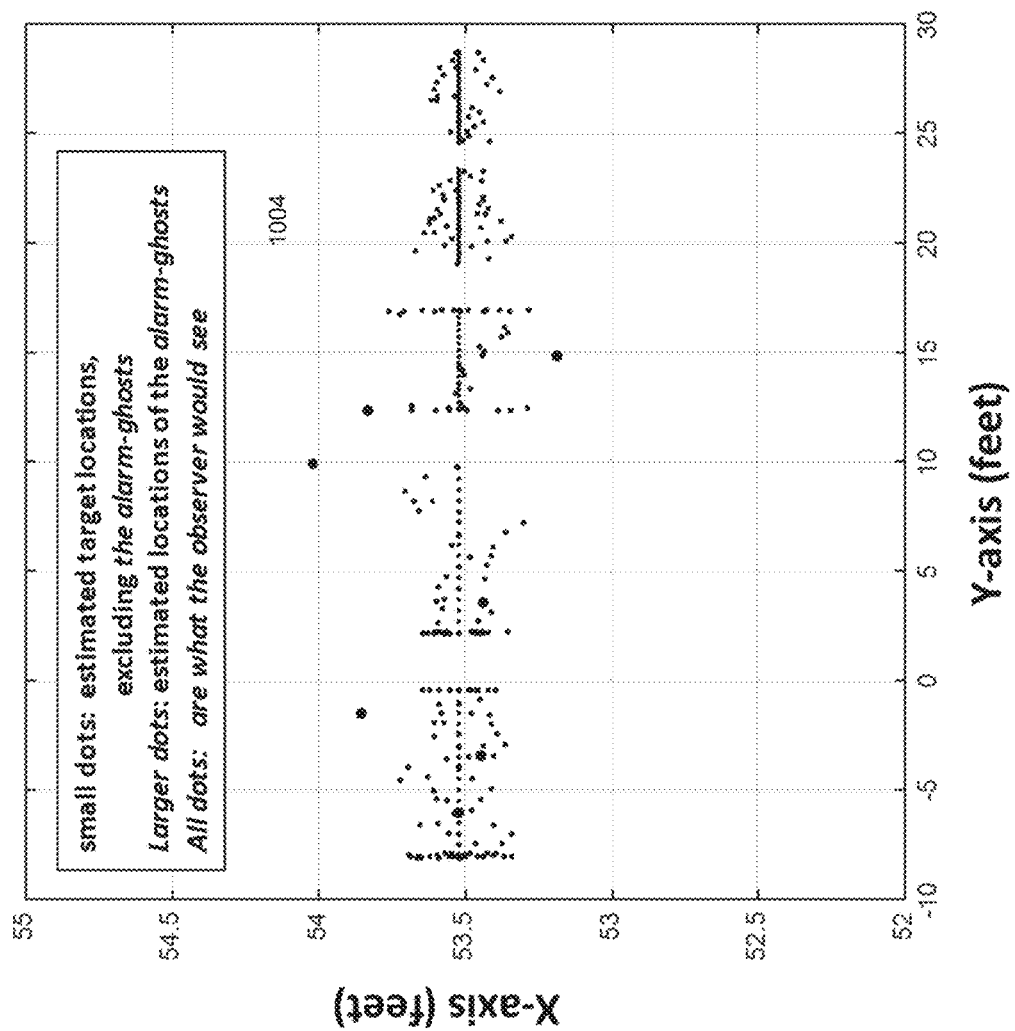

Referring to FIG. 10C, a YX-image 1004 was also obtained by using the fusion/associator to process the data used to generate FIGS. 10A and 10B. As in FIG. 10B, the image 1004 is free of target-by-target-induced ghosts, and the same seven alarm-to-target induced ghosts as found in the image 1002 FIG. 10B are also present in the image 1004 of FIG. 10C. The Boolean performance is at the limit of measured resolutions, although errors in the seven ghost locations do not necessarily obey the measurement resolution limit. The range resolution is 0.5 feet and so target errors in the X-dimension are limited by this resolution. Indeed, the X-errors in the figure are typically just +/−0.25 feet, except for the seven ghost errors that reach up to 0.5 feet of X-displacement from the target (defined by any and all of its letters).

The cross-range ($\alpha$) resolution is 4 mrad, and at a range of 54 feet and slightly beyond, the cross-range target errors in the Y-dimension should be less than this resolution times the range, i.e., 0.22 feet. Indeed, the target errors in the Y-dimension as observed in FIG. 10B are typically just 0.1 feet, except for the seven ghost errors that reach up to a few feet of displacement from the target. In fact, the ghosts are generally contained within the span of detections located for the entire set of RFNAV letters, as a whole. This is confirmed in YZ in the imaging of all 400 ghosts shown in the image 1000 of FIG. 10A, and again for the few ghosts that remain after processing by the fusion/associator in the images of FIGS. 10B and 10C. Similarly, the Z-dimension ghost errors are generally contained within the span of detections located for each letter of "RVNAV," as can be seen in the image 1002 of FIG. 10B. The ghost just below the letter R in FIG. 10B is about 1 foot below the Z-span of the letter R. The other six detections are also within the Z-span of one of the letters of the target.

That these ghost errors do not obey resolution error limits is expected since they are not real locations. Rather, the ghosts are the result of a false bin in one radar combined with a true target bin in the other radar. For example, the detection above the letter N at Y=15 feet in FIG. 10B could be the result of the target letter N in the azimuth radar, combined with a noise alarm in the elevation radar, where the latter can come from anywhere in elevation. Otherwise this same ghost could have been produced by a noise alarm in the azimuth radar which happens to be located above the N, combined with a target letter (either R or F but no others) because these 2 letters contain (span) the Z-location of this ghost. Each ghost arises from a target letter in one radar, but then it arises in any location relative to the target letters in the other radar.

Figure 11A:
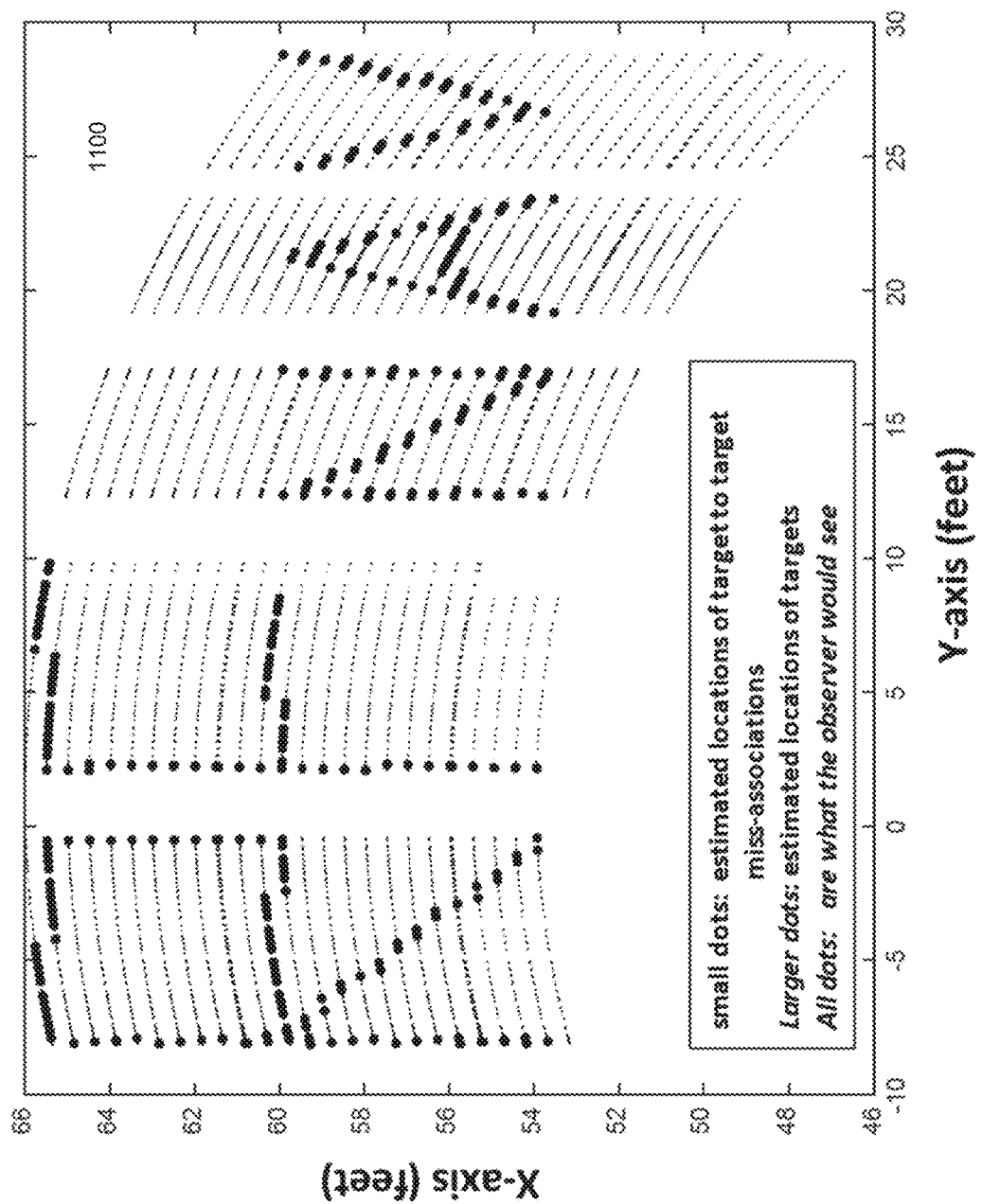
FIGS. 11A and 11B are YX-images of a target lying in a horizontal plane, imaged without and with the use of a single look, low-ghost association and target location system, respectively.
Figure 11B:
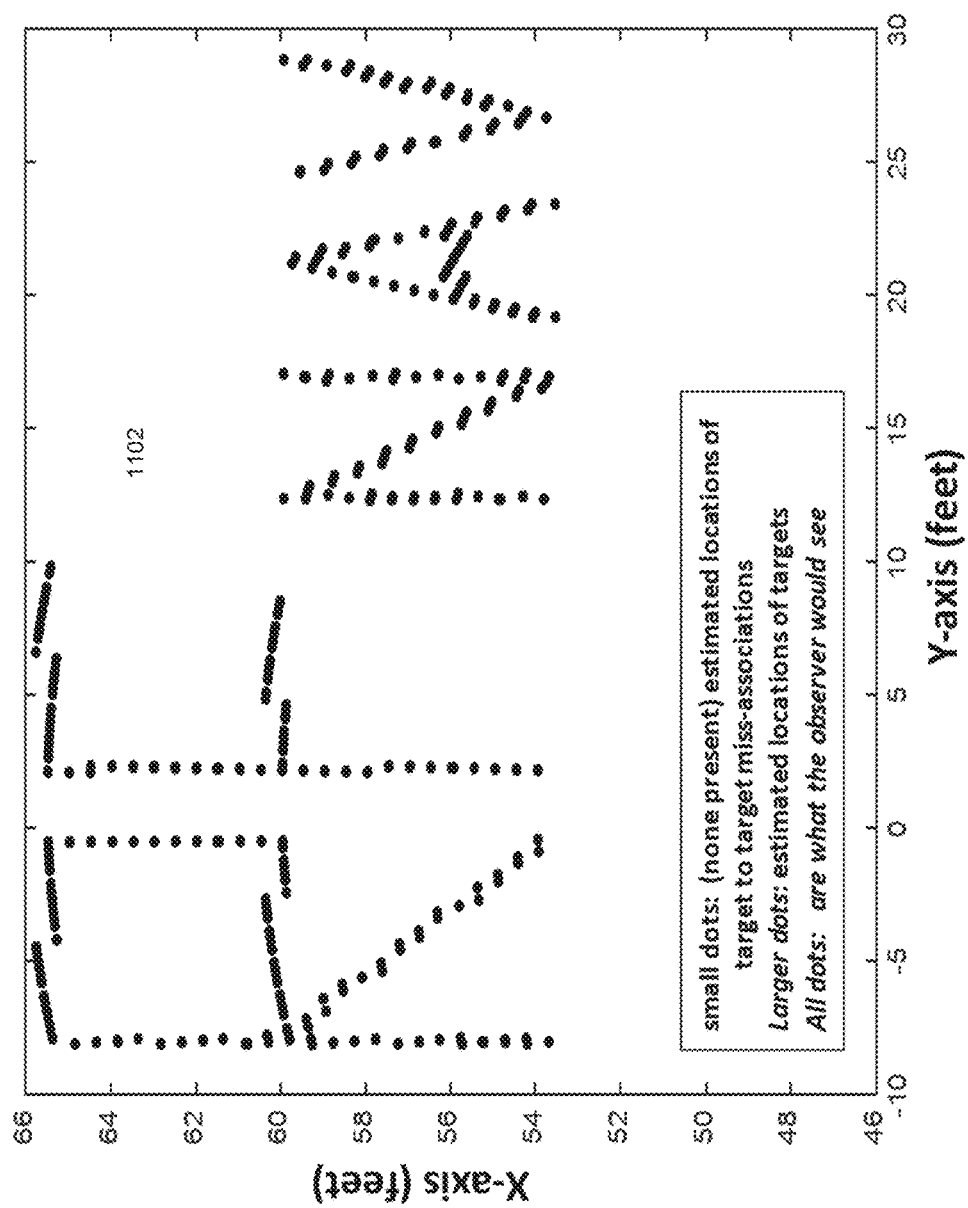

Target to target ghosts can reduce or destroy image quality. FIGS. 11A and 11B depict YX-image 1100, 1102 of the "RFNAV" letters target laying in a horizontal plane, configured in the same way as the target of FIGS. 8A and 8B. In FIGS. 11A and 11B, the only ghosts shown are target-to-target ghosts, which are ghosts produced solely by target miss-associations of the actual target locations present in the environment with themselves. In the image 1100 of FIG. 11A, the fusion/associator is not activated, thus showing the presence of target miss-associations. The small dots represent estimated locations of target to target miss-associations and the larger dots represent estimated locations of targets. Without the fusion/associator activated, an observer would not be able to make out the letters "RFNAV". In the image 1102 of FIG. 11B, the fusion/associator is activated to show that all of the target-to-target ghosts are removed. Only large dots are present and the letters "RFNAV" are clearly distinguishable, in fact, optimal association was achieved.

In some examples, the false alarms in the fusion/associator's outputs can be reduced using techniques such as multi-look integration or coincidence detection across multiple looks. The generated detection vectors can also use measurement to track association, but now having rejected more alarms per look, those associations across time are easier to accomplish.

Distinct from the random distribution of 4-D spatial addresses that arises due to thermal noise induced false alarms, other interference sources such as multipath, sidelobes, circuit cross-talk, etc., are likely to have more spatial address correlation. Still, when the interference sources generate a non-admissible 4-D spatial address, no association will occur resulting in interference removal from the RF derived image.

In an example approach to pre-calculating and loading the target dictionary, the common FOV, in Cartesian space, is estimated given the phase center baseline between radars, aperture boresight angles, min/max range, and/or flood illumination transmit beam widths, or other characteristics. A set of oversampled 3-D Cartesian points, relative to the spatial resolutions dR, dα, and dφ in the FOV, are calculated. Each sample point in the FOV volume is quantized to form the 4-D spatial address ($R_\alpha Q$, $\alpha Q$, $R_e Q$, $\phi Q$). Each 4-D spatial address is converted into a corresponding binary spatial address ($R_\alpha B$, $\alpha B$, $R_e B$, $\phi B$). The 3-D center, ($x_c$, $y_c$, $z_c$), is estimated from all points having the same 4-D spatial address. Only unique spatial addresses are stored in the dictionary.

The size of the memory is both practical and low cost for many applications. The dictionary memory contains only addresses for admissible target voxels in the FOV. As an example consider an autonomous car, where the azimuthal radar can have 1000 range bins with 400 angle bins and the elevation radar can have 1000 range bins with 200 angle bins. The entries in the dictionary, equivalent to the number of admissible target voxels in the common FOV, upper bounded by circa 160 million for this example, is a function of the phase center baseline and each aperture's boresight orientation. Storage of a 160 million entry dictionary is realized at low cost with off-the-shelf volatile or non-volatile memory.

For some multi-static mobile sensors where the common FOV volume is small, a dynamic target dictionary can also be practical. One example includes two mobile cooperating drones in flight where both the phase center baseline, [$d_x$ $d_y$ $d_z$], and each drone's 3-D orientation is dynamic but known. One drone can carry both the azimuthal radar and the elevation radar. An alternative is for one drone to carry the azimuthal radar while the other drone carries the elevation radar. A high bandwidth data link sends ($R_e Q$, $\phi Q$, $v_e$) measurement reports from the elevation radar to the azimuthal radar where 3-D target association and position estimation occurs. Each time when either the aperture orientations or the phase center baseline changes by an amount that exceeds a fraction of the correlated spatial resolutions, then a new dictionary is re-calculated and loaded. Let dT be the smallest time interval associated with a drone position change requiring a dictionary update. Then a practical real-time realization of the dynamic target dictionary occurs when the common FOV is small enough so that the total communication latency plus the computational time to update the Target Dictionary is <<dT.

For some other applications with very large FOVs or rapid baseline changes, the larger FOV can be partitioned into sub-volumes. The sub-volume with its smaller sub-dictionary reduces the size of sub-dictionary memory. By performing each sub-dictionary pre-load calculation in parallel with N sub-dictionaries, the total dictionary update time can be reduced by a factor of 1/N.

The dictionary can assume knowledge or a calibration of the phase center baseline between the azimuthal radar and the elevation radar, their boresight orientations, and/or range biases. In some operational scenarios, such as when the radars are on different mobile platforms, these calibrations may drift. The change in these calibrations can be detected and accounted for.

The fusion/associator, incorporating multi-resolution dictionaries, can be used to detect an "out-of-calibration" condition. Two or more dictionaries are pre-calculated with the original, and presumed, calibration. One of the dictionaries is at normal spatial resolution (dR, dα, dφ) while the other, smaller sized dictionaries, are at a spoiled resolution of (N×dR, N×dα, N×dφ), where N>=2. The sufficient statistic and detection threshold for the joint voltage measurements are modified to account for the spoiled resolution dictionary. Both dictionaries are run in parallel. The resolution is reduced only in the association space; the analog spatial resolution from each radar's beam-former etc. is unchanged at (dR, dα, dφ).

Two tests can be used to recognize the out-of-calibration condition on a single look. First, the number of targets generated by the fusion/associator's normal resolution dictionary is less than the number generated by the fusion/associator's spoiled resolution dictionary. Second, one or more isolated targets found with the spoiled resolution dictionary are not found with the normal resolution dictionary. The isolated targets can be opportunistic targets, a repeater, or a corner reflector placed in the FOV. Once the out-of-calibration signal alert is made, the dictionary can be recalculated.

In some examples, the approaches described here can be used for an arbitrary number (N) of 2D-incomplete radars, e.g., by forming associations from the 2-paired combinations of N 2D-incomplete radars.

In some examples, other types of sensor signals can be received in addition to or instead of radar signals. Example sensor signals can include radar signals, imaging signals, or other types of signals. In some examples, other types of signal characteristics can be used in addition to or instead of voltage. Example signal characteristics include voltage, characteristics of photons, or other types of characteristics.

In some examples, the approaches described here can be used for target fusion between sensors with different features, such as different wavelengths, resolutions, and/or completeness (e.g., 2D or 3D sensors). The baseline separations between sensors are assumed to exceed the maximum of each sensor's spatial resolution. One example is the target fusion/association between a 2-D azimuthal radar and a 3-D Lidar. The 2-D azimuthal radar estimates ($R_\alpha Q$, $\alpha Q$, $v_\alpha$). The 3-D Lidar sensor estimates range, $R_L$, azimuth angle in the XY plane, θL, elevation angle $\phi_L$, and photon count $v_L$, generating the 4-D quantized measurements ($R_L Q$, $\theta_L Q$, $\phi_L Q$, $v_L$). In this case the dictionary has a corresponding binary five-dimensional (5-D) spatial address ($R_L Q$, $\theta_L Q$, $\phi_L Q$, $R_\alpha Q$, $\alpha Q$), while the sufficient statistic is a function of both the received voltage from the azimuthal radar and the number of photons received by the Lidar, $f(v_\alpha, v_L)$. The detection threshold is set to satisfy a desired $P_d$ given the multi-mode derived statistic, $f(v_\alpha, v_L)$. Finally, the associated 3-D voxel center ($x_c$, $y_c$, $z_c$) represents the voxel formed by the voxel intersections of the two different mode and different resolution sensors.

Another example is the fusion of a 3-D radar, a 3-D camera, a 3-D Lidar, and a 3-D ultrasound sensor each with different spatial resolutions. The radar measurement returns the measurements ($RQ_R$, $\theta Q_R$, $\phi Q_R$, $v_R$), the 3-D camera system returns ($RQ_C$, $\theta Q_C$, $\phi Q_C$, $v_C$), the Lidar returns ($RQ_L$, $\theta Q_L$, $\phi Q_L$, $v_L$), and the 3-D ultrasound system returns ($RQ_U$, $\theta Q_U$, $\phi Q_U$, $v_U$), where $v_R$ is the radar's voltage measurement, $v_C$ is the camera's photon count, $v_L$, is the Lidar's photon count, $v_U$ is the ultrasound sensor's voltage measurement. The 12-D spatial address ($RQ_R$, $\theta Q_R$, $\phi Q_R$, $RQ_C$, $\theta Q_C$, $\phi Q_C$, $RQ_L$, $\theta Q_L$, $\phi Q_L$, $RQ_U$, $\theta Q_U$, $\phi Q_U$) is first checked for admissibility, followed by evaluation of the sufficient statistic, $f(v_R, v_C, v_L, v_U)$ to determine if it passes a threshold.

In some examples, the approaches described here can be used for 3D-complete multi-static radars. When used for multi-static radar target association and position estimation, can result in both elimination of non-admissible ghosts on a single look and elimination of spatial quantization noise in the Cartesian target location estimate. For a noise free single look measurement, a single 3-D radar, with its 2-D physical aperture, obtains a unique 3-D quantized spatial address in spherical coordinates and a received voltage, (RQ, $\theta Q$, $\phi Q$, v) for each valid target. Let there be two 3-D radars, Radar1 and Radar2, each obtaining 3-D spatial addresses and a received voltage for each target, ($RQ_1$, $\theta Q_1$, $\phi Q_1$, $v_1$) and ($RQ_2$, $\theta Q_2$, $\phi Q_2$, $v_2$), respectively. In this situation, non-admissible ghosts due to association and position estimation can be mitigated as follows. The dictionary is pre-loaded with only valid target six-dimensional (6-D) spatial addresses, ($RQ_1$, $\theta Q_1$, $\phi Q_1$, $RQ_2$, $\theta Q_2$, $\phi Q_2$), along with the associated joint voxel center ($x_c$, $y_c$, $z_c$) for each 6-D spatial address as the target location. The sufficient statistic, $f(v_1, v_2)$, is detected with a threshold set for a desired $P_d$, given the joint statistic.

The approaches described here, used for multi-static radar target association and position estimation, can eliminate of non-admissible ghosts on a single look and can reduce spatial quantization noise in the Cartesian target location estimate. The reduction in spatial quantization noise is due to the absence of inversion of the 6-D quantized measurements ($RQ_1$, $\theta Q_1$, $\phi Q_1$, $RQ_2$, $\theta Q_2$, $\phi Q_2$) to Cartesian position by a set of non-linear spherical coordinate equation sets across the two multi-static radars, analogous to equations (1-4).

In some examples, the fusion/associator described here can be extended to voxels that are defined by probability boundaries in addition to spatial resolutions. For instance, the probability boundaries can be obtained by combining smoothed covariance estimates and n out of m coincidence detection methods. Multiple dictionaries can be defined as a function of covariance with the multi-look target probability voxels. This approach to probabilistic association can have a finite probability of forming non-admissible ghosts.

Additional information about low cost 3-D radar imaging and 3-D association methods can be found in U.S. patent application Ser. No. 15/467,299, filed Mar. 23, 2017, the contents of which are incorporated here by reference in their entirety.

The approaches described here can have one or more of the following advantages.

The fusion/associator operates sensor to sensor on a single look, rather than on a multi look basis. The approaches described here can be merged with measurement to track algorithms to achieve higher quality imaging and more confident tracking.

The approaches described here can eliminate non-admissible ghosts on a single look with simultaneous 3-D data association and position estimation for an architecture including two geographically diverse 2-D incomplete radars.

The approaches described here are free from spatial quantization noise that is introduced by inversion from measurements back to Cartesian space, e.g., for purposes of validation volume bounded by covariance ellipses. The result is reduced 3-D estimation covariance.

The approaches here can find the equivalent of the optimal decision boundaries between true targets and non-admissible ghosts with a range-angle spatial indexed dictionary. The dictionary can dichotomize non-admissible ghosts from targets only allowing valid target locations to associate. The result is RF-derived imagery with no non-admissible ghosts, rather than having a threshold screening that can result in false target presentations. The approaches here can apply to imagery derived from other domains, such as optical, acoustic, etc.

The approaches here employ a simple dictionary or lookup table to directly map N-dimensional spatial addresses to valid 3-D target locations without using complex models, time consuming optimization, and without assumptions of sparsity in the scene or spatial statistical distributions, e.g., Gaussian distributions. The simplicity of the dictionary permits rapid construction making the dictionary suitable for real time mobile applications where the baseline and its orientation can change over time.

The approaches here can mitigate false target associations due to thermal noise or interference sources such as multi-path, measurement sidelobes, RF/IF analog channel cross talk, etc. For instance, the approaches here can test to see if the fused or associated product satisfies the 4-D spatial address admissibility and voltage pair conditions. The approaches here can reduce image error by reducing RF artifacts in 3-D RF derived or other types of images.

Figure 12:
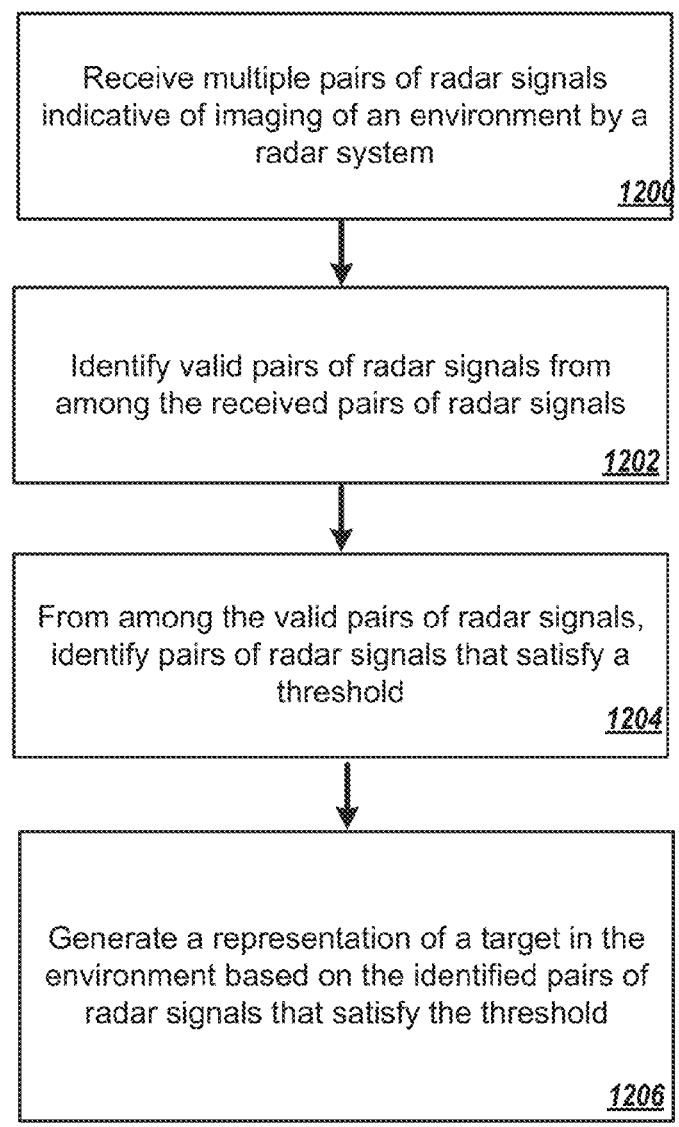
FIG. 12 is a flow chart.

Referring to FIG. 12, in an example method, multiple pairs of radar signals are received (1200). The radar signals are indicative of imaging of an environment by a radar system. Each pair of radar signals includes (i) a first radar signal received from a first radar sensor of the radar system and including first spatial coordinates and a first voltage and (ii) a second radar signal received from a second radar sensor of the radar system and including second spatial coordinates and a second voltage.

Valid pairs of radar signals are identified from among the multiple pairs of radar signals (1202). Identifying a given pair of radar signals as a valid pair includes determining that an address including the first coordinates of the first radar signal of the given pair and the second coordinates of the second radar signal of the given pair corresponds to an admissible address in a set of admissible addresses stored in a data storage.

From among the valid pairs of radar signals, one or more pairs of radar signals that satisfy a threshold are identified (1204). Identifying that a given pair of radar signals satisfies a threshold includes determining that a value based on a combination of the first voltage of the given pair and the second voltage of the given pair satisfies a threshold value. A representation of a target in the environment is generated based on the identified pairs of radar signals that satisfy the threshold (1206).

For high frame rate imaging applications, the hardware implementation of the fusion/association machinery is parallel pipelined logic using field programmable gate arrays (FPGAs) and application specific integrated circuits (ASICs) for the detection prescreening function 502, the range prescreening function 504, the Q-to-Bin conversion 516, and calculation of the detection sufficient statistic 514 and 516. The dictionary 506 is implemented with multiple high speed non-volatile memories.

Figure 13:
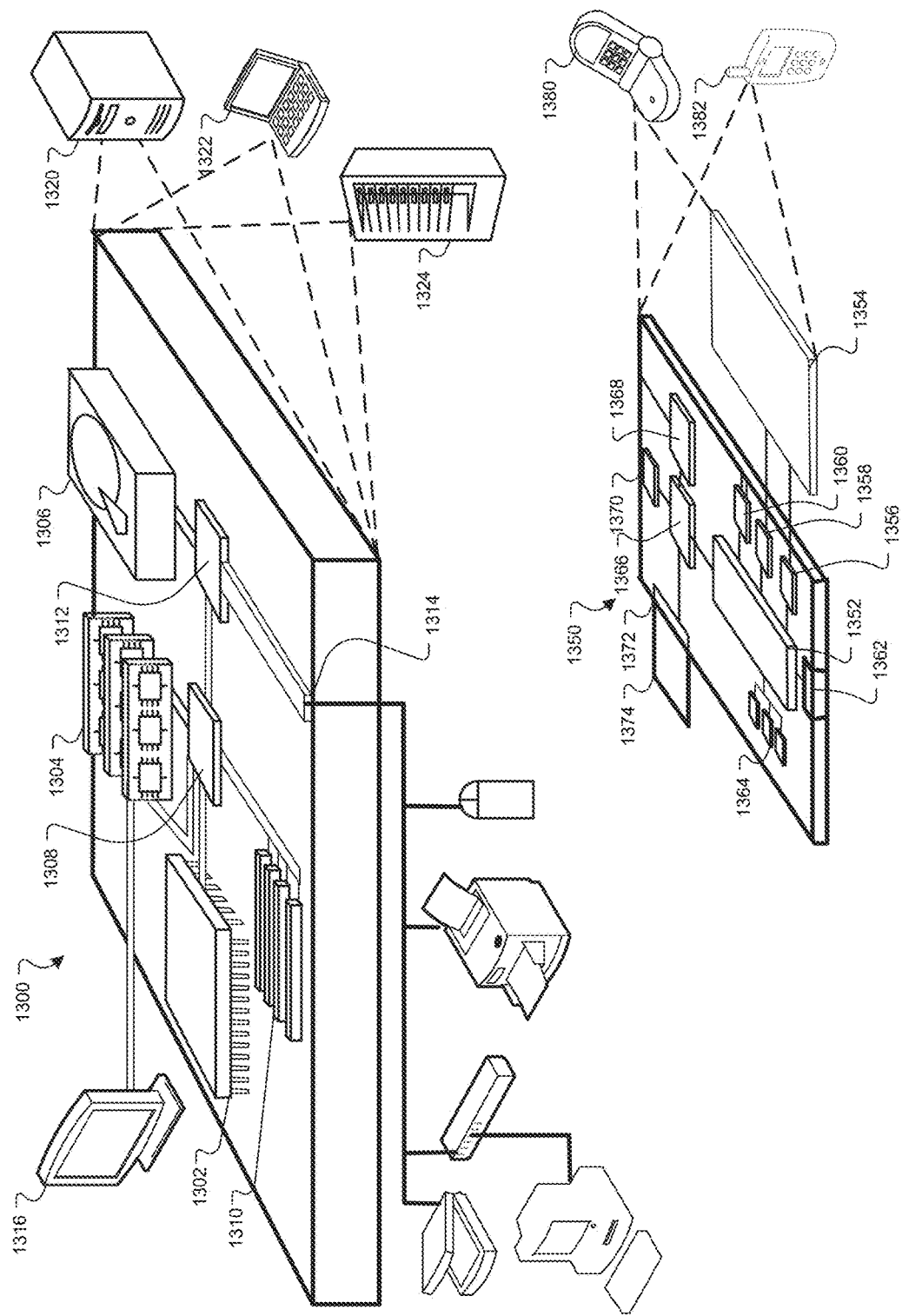
FIG. 13 is a block diagram of computing devices and systems.

FIG. 13 shows an example of example computer device 1300 and example mobile computer device 1350, which can be used to implement the techniques described herein. For example, a portion or all of the operations of the fusion/associator may be executed by the computer device 1300 and/or the mobile computer device 1350. Computing device 1300 is intended to represent various forms of digital computers, including, e.g., laptops, desktops, workstations, personal digital assistants, servers, blade servers, mainframes, and other appropriate computers. Computing device 1350 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 1300 includes processor 1302, memory 1304, storage device 1306, high-speed interface 1308 connecting to memory 1304 and high-speed expansion ports 1310, and low speed interface 1312 connecting to low speed bus 1314 and storage device 1306. Each of components 1302, 1304, 1306, 1308, 1310, and 1312, are interconnected using various busses, and can be mounted on a common motherboard or in other manners as appropriate. Processor 1302 can process instructions for execution within computing device 1300, including instructions stored in memory 1304 or on storage device 1306 to display graphical data for a GUI on an external input/output device, including, e.g., display 1316 coupled to high speed interface 1308. In other implementations, multiple processors and/or multiple buses can be used, as appropriate, along with multiple memories and types of memory. Also, multiple computing devices 1300 can be connected, with each device providing portions of the necessary operations (e.g., as a server bank, a group of blade servers, or a multi-processor system).

Memory 1304 stores data within computing device 1300. In one implementation, memory 1304 is a volatile memory unit or units. In another implementation, memory 1304 is a non-volatile memory unit or units. Memory 1304 also can be another form of computer-readable medium, including, e.g., a magnetic or optical disk.

Storage device 1306 is capable of providing mass storage for computing device 1300. In one implementation, storage device 1306 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 1304, storage device 1306, memory on processor 1302, and the like.

High-speed controller 1308 manages bandwidth-intensive operations for computing device 1300, while low speed controller 1312 manages lower bandwidth-intensive operations. Such allocation of functions is an example only. In one implementation, high-speed controller 1308 is coupled to memory 1304, display 1316 (e.g., through a graphics processor or accelerator), and to high-speed expansion ports 1310, which can accept various expansion cards (not shown). In the implementation, low-speed controller 1312 is coupled to storage device 1306 and low-speed expansion port 1314. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 1300 can be implemented in a number of different forms, as shown in the figure. For example, it can be implemented as standard server 1320, or multiple times in a group of such servers. It also can be implemented as part of rack server system 1324. In addition, or as an alternative, it can be implemented in a personal computer including, e.g., laptop computer 1322. In some examples, components from computing device 1300 can be combined with other components in a mobile device (not shown), including, e.g., device 1350. Each of such devices can contain one or more of computing device 1300, 1350, and an entire system can be made up of multiple computing devices 1300, 1350 communicating with each other.

Computing device 1350 includes processor 1352, memory 1364, an input/output device including, e.g., display 1354, communication interface 1366, and transceiver 1368, among other components. Device 1350 also can be provided with a storage device, including, e.g., a microdrive or other device, to provide additional storage. Each of components 1350, 1352, 1364, 1354, 1366, and 1368, are interconnected using various buses, and several of the components can be mounted on a common motherboard or in other manners as appropriate.

Processor 1352 can execute instructions within computing device 1350, including instructions stored in memory 1364. The processor can be implemented as a chipset of chips that include separate and multiple analog and digital processors. The processor can provide, for example, for coordination of the other components of device 1350, including, e.g., control of user interfaces, applications run by device 1350, and wireless communication by device 1350.

Processor 1352 can communicate with a user through control interface 1358 and display interface 1356 coupled to display 1354. Display 1354 can be, for example, a TFT LCD (Thin-Film-Transistor Liquid Crystal Display) or an OLED (Organic Light Emitting Diode) display, or other appropriate display technology. Display interface 1356 can comprise appropriate circuitry for driving display 1354 to present graphical and other data to a user. Control interface 1358 can receive commands from a user and convert them for submission to processor 1352. In addition, external interface 1362 can communicate with processor 1342, so as to enable near area communication of device 1350 with other devices. External interface 1362 can provide, for example, for wired communication in some implementations, or for wireless communication in other implementations, and multiple interfaces also can be used.

Memory 1364 stores data within computing device 1350. Memory 1364 can be implemented as one or more of a computer-readable medium or media, a volatile memory unit or units, or a non-volatile memory unit or units. Expansion memory 1374 also can be provided and connected to device 1350 through expansion interface 1372, which can include, for example, a SIMM (Single In Line Memory Module) card interface. Such expansion memory 1374 can provide extra storage space for device 1350, or also can store applications or other data for device 1350. Specifically, expansion memory 1374 can include instructions to carry out or supplement the processes described above, and can include secure data also. Thus, for example, expansion memory 1374 can be provided as a security module for device 1350, and can be programmed with instructions that permit secure use of device 1350. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 1364, expansion memory 1374, and/or memory on processor 1352, which can be received, for example, over transceiver 1368 or external interface 1362.

Device 1350 can communicate wirelessly through communication interface 1366, which can include digital signal processing circuitry where necessary. Communication interface 1366 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 1368. In addition, short-range communication can occur, including, e.g., using a Bluetooth®, WiFi, or other such transceiver (not shown). In addition, GPS (Global Positioning System) receiver module 1370 can provide additional navigation- and location-related wireless data to device 1350, which can be used as appropriate by applications running on device 1350.

Device 1350 also can communicate audibly using audio codec 1360, which can receive spoken data from a user and convert it to usable digital data. Audio codec 1360 can likewise generate audible sound for a user, including, e.g., through a speaker, e.g., in a handset of device 1350. Such sound can include sound from voice telephone calls, can include recorded sound (e.g., voice messages, music files, and the like) and also can include sound generated by applications operating on device 1350.

Computing device 1350 can be implemented in a number of different forms, as shown in the figure. For example, it can be implemented as cellular telephone 1380. It also can be implemented as part of smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A system comprising:
   a computing device comprising a memory configured to store instructions and a processor to execute the instructions to perform operations comprising:
   receiving multiple pairs of sensor signals indicative of imaging of an environment by a single-look sensor system, each pair of sensor signals including (i) a first sensor signal received from a first sensor of the sensor system and including first spatial coordinates and a first signal characteristic and (ii) a second sensor signal received from a second sensor of the sensor system and including second spatial coordinates and a second signal characteristic;
   identifying valid pairs of sensor signals from among the multiple pairs of sensor signals, in which identifying a given pair of sensor signals as a valid pair includes:
   determining that an address including the first coordinates of the first sensor signal of the given pair and the second coordinates of the second sensor signal of the given pair corresponds to an admissible address in a set of admissible addresses stored in a data storage;

identifying, from among the valid pairs of sensor signals, one or more pairs of sensor signals that satisfy a threshold, in which identifying that a given pair of sensor signals satisfies a threshold includes:
determining that a value based on a combination of the first signal characteristic of the given pair and the second signal characteristic of the given pair satisfies a threshold value;

generating a representation of a target in the environment based on the identified one or more pairs of sensor signals that satisfy the threshold; and generating a vector corresponding to each of the identified pairs of sensor signals that satisfy the threshold, the vector for a given identified pair of sensor signals including coordinates of a voxel center corresponding to the address.

2. The system of claim 1, in which the single-look sensor system is a single-look radar system.

3. The system of claim 1, in which the operations comprise identifying non-admissible pairs of sensor signals from among the multiple pairs of sensor signals, and
in which the representation is generated without using the non-admissible pairs of sensor signals.

4. The system of claim 3, in which identifying a given pair of sensor signals as a non-admissible pair includes determining that an address including the first coordinates of the first sensor signal of the given pair and the second coordinates of the second sensor signal of the given pair does not correspond to an admissible address in the set of admissible addresses.

5. The system of claim 1, in which the operations comprise identifying pairs of sensor signals that correspond to points outside a field of view of the first sensor and the second sensor, and
in which the representation is generated without using the pairs of sensor signals that correspond to points outside the field of view.

6. The system of claim 1, in which identifying that a given pair of sensor signals satisfies a threshold includes determining that a product of the first signal characteristic of the given pair and the second signal characteristic of the given pair exceeds a minimum threshold value.

7. The system of claim 1, in which identifying that a given pair of sensor signals satisfies a threshold includes determining that a difference between the first signal characteristic of the given pair and the second signal characteristic of the given pair is less than a maximum threshold value.

8. The system of claim 1, in which the vector for a given identified pair of sensor signals includes (i) the address including the first coordinates of the first sensor signal of the given pair and the second coordinates of the second sensor signal of the given pair and (ii) the first signal characteristic of the given pair and the second signal characteristic of the given pair.

9. The system of claim 1, in which the coordinates of the voxel center corresponding to the address are stored in the data storage in conjunction with the admissible address corresponding to the address.

10. The system of claim 1, in which generating the representation of the target in the environment comprises generating the representation based on vectors corresponding to the identified pairs of sensor signals that satisfy the threshold.

11. The system of claim 1, in which the multiple pairs of sensor signals are indicative of imaging of an environment in the vicinity of a vehicle, and
comprising controlling navigation of the vehicle based on the generated representation of the target in the environment.

12. The system of claim 1, in which the first sensor and the second sensor are located at different positions.

13. The system of claim 1, in which the first sensor and the second sensor comprise 2-D incomplete radars.

14. The system of claim 1, in which the first sensor and the second sensor comprise 3-D complete radars.

15. The system of claim 1, in which first sensor is a different type of sensor from the second sensor.

16. The system of claim 1, in which the first sensor and the second sensor are selected from the group consisting of 2-D radar, 3-D radar, 3-D Lidar, 3-D stereoscopic camera, 3-D IR, and 3-D Sonar.

17. The system of claim 1, in which the first sensor and the second sensor are separated by a distance that exceeds a maximum spatial resolution of each of the first sensor and the second sensor.

18. The system of claim 1, in which the set of admissible addresses stored in the data storage comprises a mapping between each admissible address and a set of 3-D coordinates.

19. The system of claim 18, in which the operations comprise determining multiple sets of admissible addresses and mappings between each admissible address and the corresponding set of 3-D coordinates.

20. The system of claim 1, in which at least one of the first sensor and the second sensor forms part of a mobile device.

21. The system of claim 1, in which the operations comprise training the set of admissible addresses based on quantized voxels defined by boundaries obtained by combining smoothed covariance estimates and multiple coincidence detection methods.

22. The system of claim 1, in which each sensor operates in a multi-dimensional space.

23. A system comprising:
a computing device comprising a memory configured to store instructions and a processor to execute the instructions to perform operations comprising:
receiving multiple pairs of radar signals indicative of imaging of an environment by a single-look radar system, each pair of radar signals including (i) a first radar signal received from a first radar sensor of the radar system and including first spatial coordinates and a first voltage and (ii) a second radar signal received from a second radar sensor of the radar system and including second spatial coordinates and a second voltage;

identifying valid pairs of radar signals from among the multiple pairs of radar signals, in which identifying a given pair of radar signals as a valid pair includes:
determining that an address including the first coordinates of the first radar signal of the given pair and the second coordinates of the second radar signal of the given pair corresponds to an admissible address in a set of admissible addresses stored in a data storage;

identifying, from among the valid pairs of radar signals, one or more pairs of radar signals that satisfy a threshold, in which identifying that a given pair of radar signals satisfies a threshold includes:

determining that a value based on a combination of the first voltage of the given pair and the second voltage of the given pair satisfies a threshold value;

generating a representation of a target in the environment based on the identified one or more pairs of radar signals that satisfy the threshold; and generating a vector corresponding to each of the identified pairs of radar signals that satisfy the threshold, the vector for a given identified pair of radar signals including coordinates of a voxel center corresponding to the address.

24. The system of claim 23, in which the first radar sensor and the second radar sensor are located at different positions.

25. The system of claim 23, in which the first radar sensor and the second radar sensor comprise at least one of 2-D incomplete radars and 3-D complete radars.

26. The system of claim 23, in which the operations comprise identifying non-admissible pairs of radar signals from among the multiple pairs of radar signals, and in which the representation is generated without using the non-admissible pairs of radar signals.

27. The system of claim 23, in which the operations comprise identifying pairs of radar signals that correspond to points outside a field of view of the first radar sensor and the second radar sensor, and in which the representation is generated without using the pairs of radar signals that correspond to points outside the field of view.

28. The system of claim 23, in which the vector for a given identified pair of radar signals includes (i) the address including the first coordinates of the first radar signal of the given pair and the second coordinates of the second radar signal of the given pair and (ii) the first voltage of the given pair and the second voltage of the given pair.

29. A computer-implemented method comprising:

receiving multiple pairs of imaging signals indicative of imaging of an environment by a single-look imaging system, each pair of imaging signals including (i) a first imaging signal received from a first imaging sensor of the imaging system and including first spatial coordinates and a first voltage and (ii) a second imaging signal received from a second imaging sensor of the imaging system and including second spatial coordinates and a second voltage;

identifying valid pairs of imaging signals from among the multiple pairs of imaging signals, in which identifying a given pair of imaging signals as a valid pair includes:
determining that an address including the first coordinates of the first imaging signal of the given pair and the second coordinates of the second imaging signal of the given pair corresponds to an admissible address in a set of admissible addresses stored in a data storage;

identifying, from among the valid pairs of imaging signals, one or more pairs of imaging signals that satisfy a threshold, in which identifying that a given pair of imaging signals satisfies a threshold includes:
determining that a value based on a combination of the first voltage of the given pair and the second voltage of the given pair satisfies a threshold value;

generating a representation of a target in the environment based on the identified one or more pairs of imaging signals that satisfy the threshold; and generating a vector corresponding to each of the identified pairs of imaging signals that satisfy the threshold, the vector for a given identified pair of imaging signals including coordinates of a voxel center corresponding to the address.

30. One or more computer readable media storing instructions that are executable by a processing device, and upon such execution cause the processing device to perform operations comprising:

receiving multiple pairs of imaging signals indicative of imaging of an environment by a single-look imaging system, each pair of imaging signals including (i) a first imaging signal received from a first imaging sensor of the imaging system and including first spatial coordinates and a first voltage and (ii) a second imaging signal received from a second imaging sensor of the imaging system and including second spatial coordinates and a second voltage;

identifying valid pairs of imaging signals from among the multiple pairs of imaging signals, in which identifying a given pair of imaging signals as a valid pair includes:
determining that an address including the first coordinates of the first imaging signal of the given pair and the second coordinates of the second imaging signal of the given pair corresponds to an admissible address in a set of admissible addresses stored in a data storage;

identifying, from among the valid pairs of imaging signals, one or more pairs of imaging signals that satisfy a threshold, in which identifying that a given pair of imaging signals satisfies a threshold includes:
determining that a value based on a combination of the first voltage of the given pair and the second voltage of the given pair satisfies a threshold value; and generating a representation of a target in the environment based on the identified one or more pairs of imaging signals that satisfy the threshold; and generating a vector corresponding to each of the identified pairs of imaging signals that satisfy the threshold, the vector for a given identified pair of imaging signals including coordinates of a voxel center corresponding to the address.

* * * * *